US008634014B2

(12) United States Patent  (10) Patent No.: US 8,634,014 B2
Kohler et al.  (45) Date of Patent: Jan. 21, 2014

(54) IMAGING DEVICE ANALYSIS SYSTEMS AND IMAGING DEVICE ANALYSIS METHODS

(75) Inventors: Timothy L. Kohler, San Jose, CA (US); Steven D. Stoecker, Fort Collins, CO (US); Jeffrey M. DiCarlo, Menlo Park, CA (US); Les Gehman, Fort Collins, CO (US); Gary J. Dispoto, Mountain View, CA (US); Eric Montgomery, San Jose, CA (US); Casey L. Miller, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2619 days.

(21) Appl. No.: 11/054,210

(22) Filed: Feb. 8, 2005

(65) Prior Publication Data

US 2005/0219363 A1  Oct. 6, 2005

Related U.S. Application Data

(63) Continuation-in-part of application No. 10/818,622, filed on Apr. 5, 2004.

(51) Int. Cl.
*H04N 5/225* (2006.01)
*H04N 5/228* (2006.01)
*H04N 5/232* (2006.01)

(52) U.S. Cl.
USPC .................. 348/335; 348/222.1; 348/345

(58) Field of Classification Search
USPC .................. 348/222.1, 335, 187, 345, 362
See application file for complete search history.

(56) References Cited

U.S. PATENT DOCUMENTS

| 4,750,148 | A | * | 6/1988 | Sage | ............................ 708/816 |
|---|---|---|---|---|---|
| 5,348,003 | A | | 9/1994 | Caro | |
| 5,355,234 | A | | 10/1994 | Kim | |
| 5,371,690 | A | | 12/1994 | Engel et al. | |
| 5,579,106 | A | | 11/1996 | Kremer | |
| 5,760,829 | A | | 6/1998 | Sussmeier | |

(Continued)

FOREIGN PATENT DOCUMENTS

EP    0990881 A    4/2000
EP    1349432 A    10/2003

(Continued)

OTHER PUBLICATIONS

"Melles Griot—Glossary"; "Pincushion Distortion"; www.mellesgriot.com/glossary/wordlist/glossarydetails.asp?wID=20188; Jan. 20, 2005; 1 pp.

(Continued)

*Primary Examiner* — Trung Diep

(57) ABSTRACT

Imaging device analysis systems and imaging device analysis methods are described. According to one embodiment, an imaging device analysis system includes a light source configured to output light for use in analyzing at least one imaging component of an imaging device, wherein the imaging device is configured to generate images responsive to received light, and processing circuitry coupled with the light source and configured to control the light source to optically communicate the light to the imaging device, wherein the processing circuitry is further configured to access image data generated by the imaging device responsive to the reception, by the imaging device, of the light from the light source and to process the image data to analyze an operational status of the at least one imaging component.

33 Claims, 21 Drawing Sheets

(56) References Cited

U.S. PATENT DOCUMENTS

| | | | |
|---|---|---|---|
| 6,125,223 | A | 9/2000 | Drozdowicz |
| 6,205,244 | B1 | 3/2001 | Bawolek |
| 6,211,911 | B1 * | 4/2001 | Komiya et al. ............. 348/218.1 |
| 6,363,220 | B1 * | 3/2002 | Ide ................................. 396/98 |
| 6,538,242 | B1 * | 3/2003 | Kuno et al. ................. 250/208.1 |
| 6,597,451 | B1 | 7/2003 | Araki |
| 6,639,574 | B2 | 10/2003 | Scheibe |
| 6,655,778 | B2 | 12/2003 | Arquilevich et al. |
| 6,759,814 | B2 | 7/2004 | Vogel et al. |
| 6,839,088 | B2 | 1/2005 | Dicarlo et al. |
| 6,864,916 | B1 * | 3/2005 | Nayar et al. ................ 348/224.1 |
| 7,006,690 | B1 | 2/2006 | Imura |
| 7,012,634 | B2 * | 3/2006 | Vogel et al. .................... 348/187 |
| 7,015,954 | B1 * | 3/2006 | Foote et al. ................. 348/218.1 |
| 7,016,533 | B1 | 3/2006 | Bawolek et al. |
| 7,075,643 | B2 | 7/2006 | Holub |
| 7,136,157 | B2 * | 11/2006 | Gomm et al. ............. 356/237.1 |
| 7,154,546 | B1 | 12/2006 | Cho |
| 7,158,170 | B2 * | 1/2007 | Gustavsson et al. .......... 348/187 |
| 7,236,195 | B2 | 6/2007 | Quan et al. |
| 7,245,319 | B1 * | 7/2007 | Enomoto ................... 348/222.1 |
| 7,254,319 | B2 * | 8/2007 | Bonnin et al. ................. 392/423 |
| 7,280,147 | B2 * | 10/2007 | Kitajima et al. .............. 348/345 |
| 7,286,166 | B2 | 10/2007 | Smith |
| 7,372,486 | B2 * | 5/2008 | Shinohara et al. ....... 348/240.99 |
| 2002/0158975 | A1 * | 10/2002 | Hiroshige et al. ............ 348/242 |
| 2002/0159066 | A1 | 10/2002 | Berstis |
| 2002/0171842 | A1 | 11/2002 | Dicarlo et al. |
| 2003/0146663 | A1 | 8/2003 | Nelson et al. |
| 2003/0185004 | A1 | 10/2003 | Vogel et al. |
| 2003/0214259 | A9 | 11/2003 | Dowling et al. |
| 2003/0223007 | A1 * | 12/2003 | Takane ........................... 348/335 |
| 2004/0081421 | A1 | 4/2004 | Mori et al. |
| 2004/0105264 | A1 | 6/2004 | Spero |
| 2004/0174433 | A1 | 9/2004 | Uchino |
| 2004/0239798 | A1 * | 12/2004 | Nayar et al. ................... 348/362 |
| 2005/0036032 | A1 * | 2/2005 | Lee et al. ....................... 348/188 |
| 2005/0041136 | A1 * | 2/2005 | Miyata et al. ................. 348/345 |
| 2005/0219364 | A1 | 10/2005 | DiCarlo |

FOREIGN PATENT DOCUMENTS

| | | |
|---|---|---|
| JP | 2002-519877 | 7/2002 |
| JP | 2003-331631 A | 11/2003 |
| WO | WO-2005/101856 A1 | 10/2005 |

OTHER PUBLICATIONS

"Melles Griot—Glossary"; "Barrel Distortion"; www.mellesgriot.com/glossary/wordlist/glossarydetails.asp?wID=102; Jan. 20, 2005; 1 pp.

"About K-Series TV OPTOLINER Systems"; www.davidsonoptronics.com/tvon002.html; Mar. 26, 2002; 2 pp.

U.S. Appl. No. 10/818,622, filed Apr. 5, 2004; "Imaging Device Calibration Methods, Imaging Device Calibration Instruments, Imaging Devices, and Articles of Manufacture".

"Imaging Device Analysis Systems and Imaging Device Analysis Methods"; DiCarlo et al.; Filed Herewith.

"Imaging Device Analysis Methods, Imaging Device Analysis Systems, and Articles of Manufacture"; DiCarlo et al.; Filed Herewith.

"Color Science"; "Concepts and Methods, Quantitative Data and Formulae,"; Wyszecki, G. et al.; John Wiley & Sons, Inc.; 1982; pp. 63-73.

" Cornerstone™ 260 1/4 m Motorized Monochromators"; http://www.newport.com/store/product.aspx?id=5385&Section=detail#; 1996; 1 pp.

Final Rejection received in related U.S. Appl. No. 11/054,209, mailed Jul. 12, 2010.

Final Rejection received in related, U.S. Appl. No. 11/260,915, mailed Aug. 5, 2010, 10pg.

Final Rejection received in related U.S. Appl. No. 11/260,915, mailed Oct. 24, 2011, 7pg.

International Search Report and Written Opinion received in PCT Application No. PCT/US2005/010508, mailed Jul. 13, 2005, 13 pg.

Kholer, et al; "Imaging Device Analysis Systems and Imaging Device Anaiysis Methods"; Feb. 8, 2005.

Non-Final Rejection reiazlived in related U.S. Appl. No. 11/054,209, mailed Dec. 30, 2009, 13pg.

Non-Final Rejection received in related U.S. Appl. No. 11/054,209, mailed Mar. 17, 2009, 15pg.

Non-Final Rejection received in related U.S. Appl. No. 11/054,209, mailed Sep. 19, 2008, 11pg.

Non-Final Rejection received in related U.S. Appl. No. 11/260,915, mailed Apr. 29, 2011, 7pg.

Non-Final Rejection received in related U.S. Appl. No. 11/260,915, mailed Aug. 28, 2012, 9pg.

Non-Final Rejection received in related U.S. Appl. No. 11/260,915, mailed Feb. 2, 2010, 8pg.

* cited by examiner

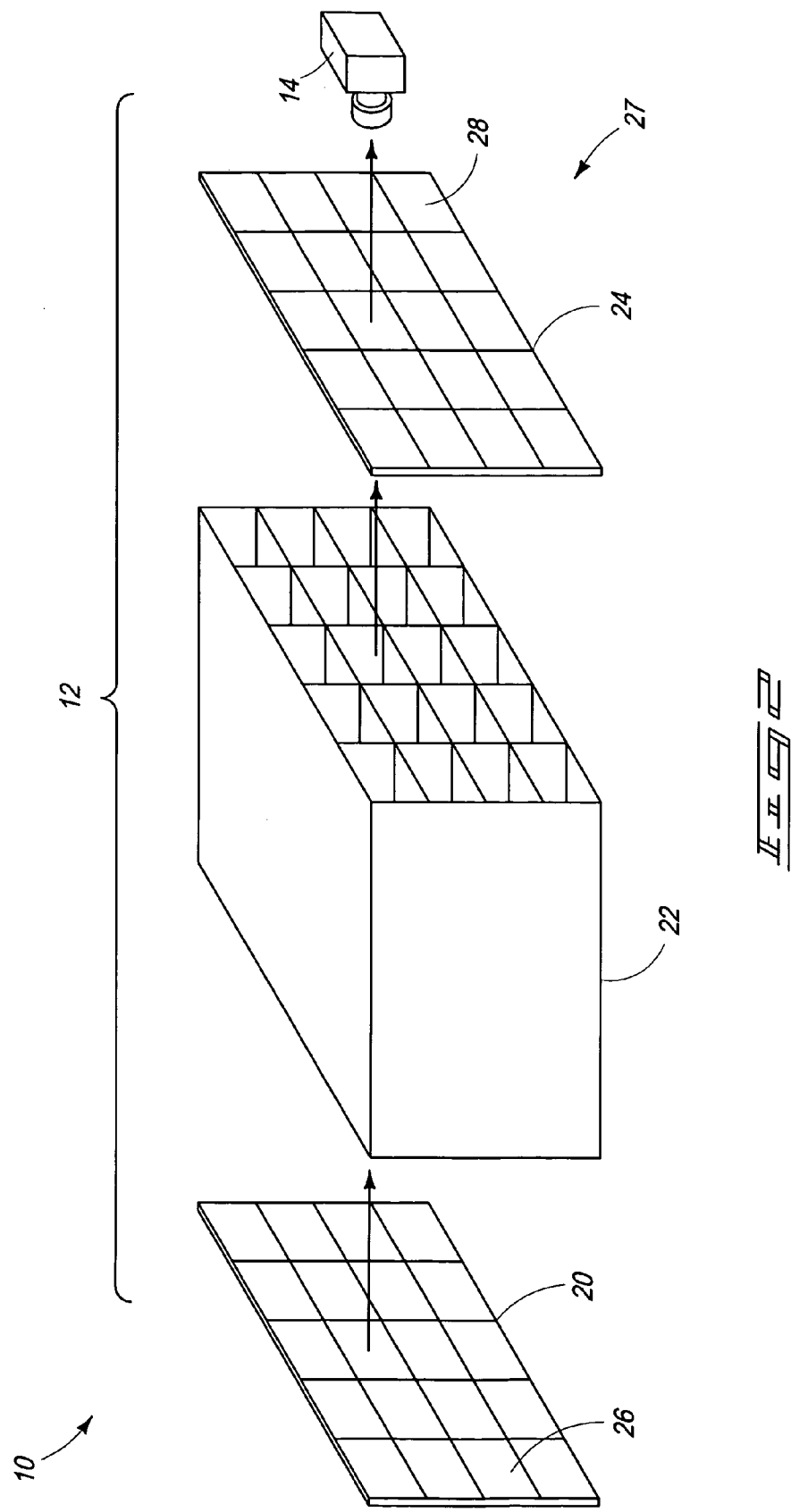

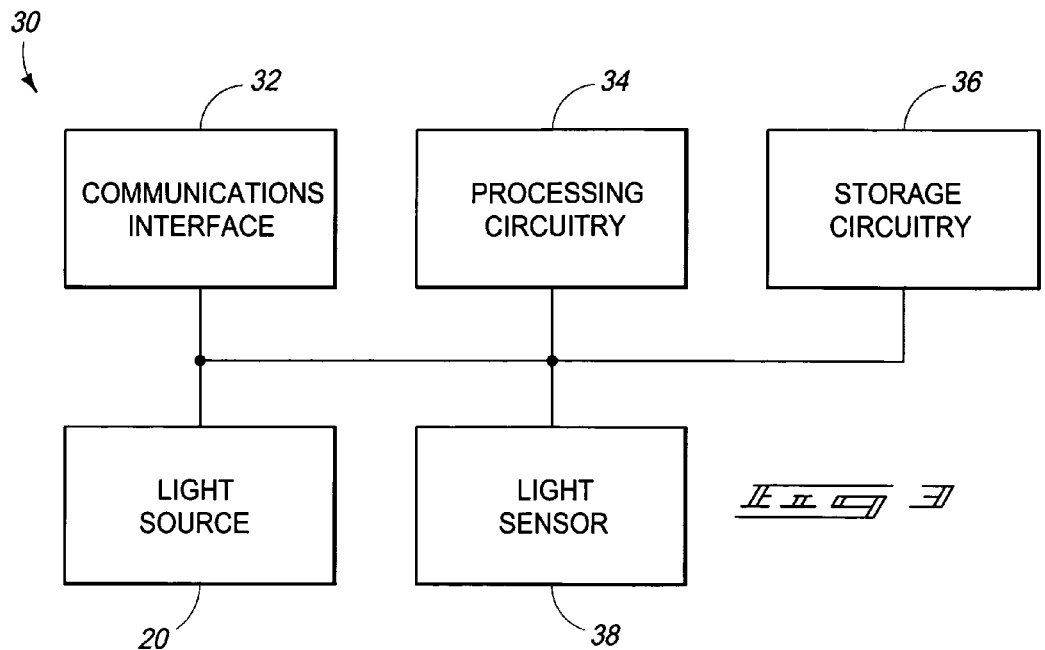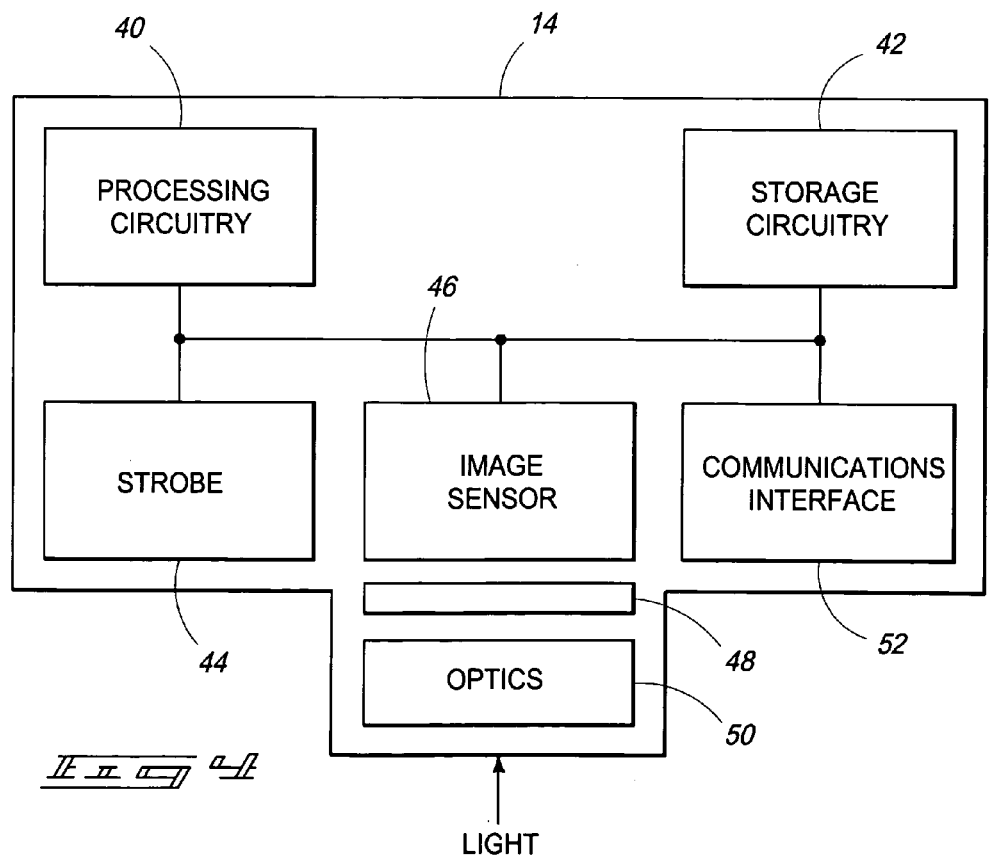

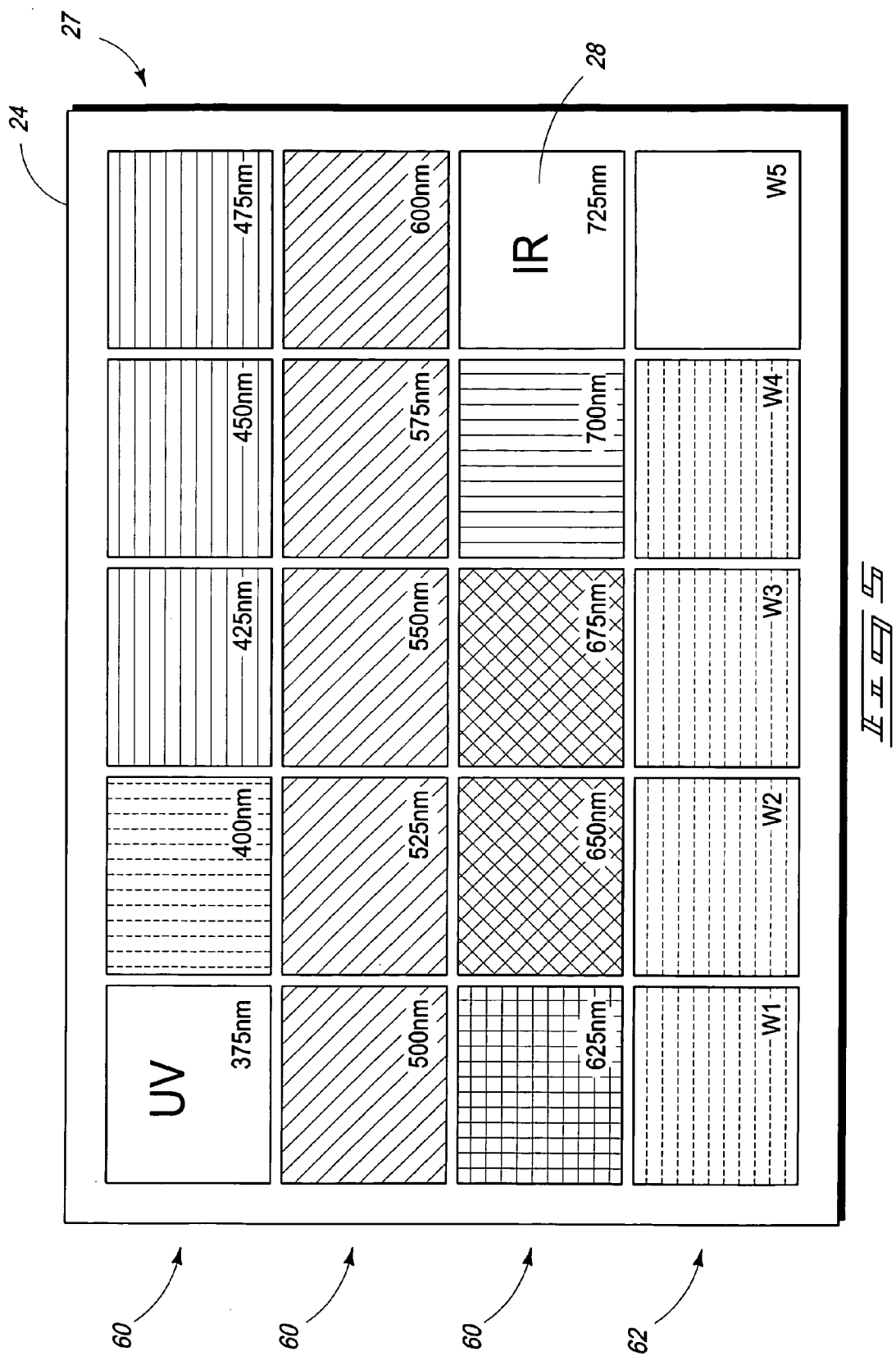

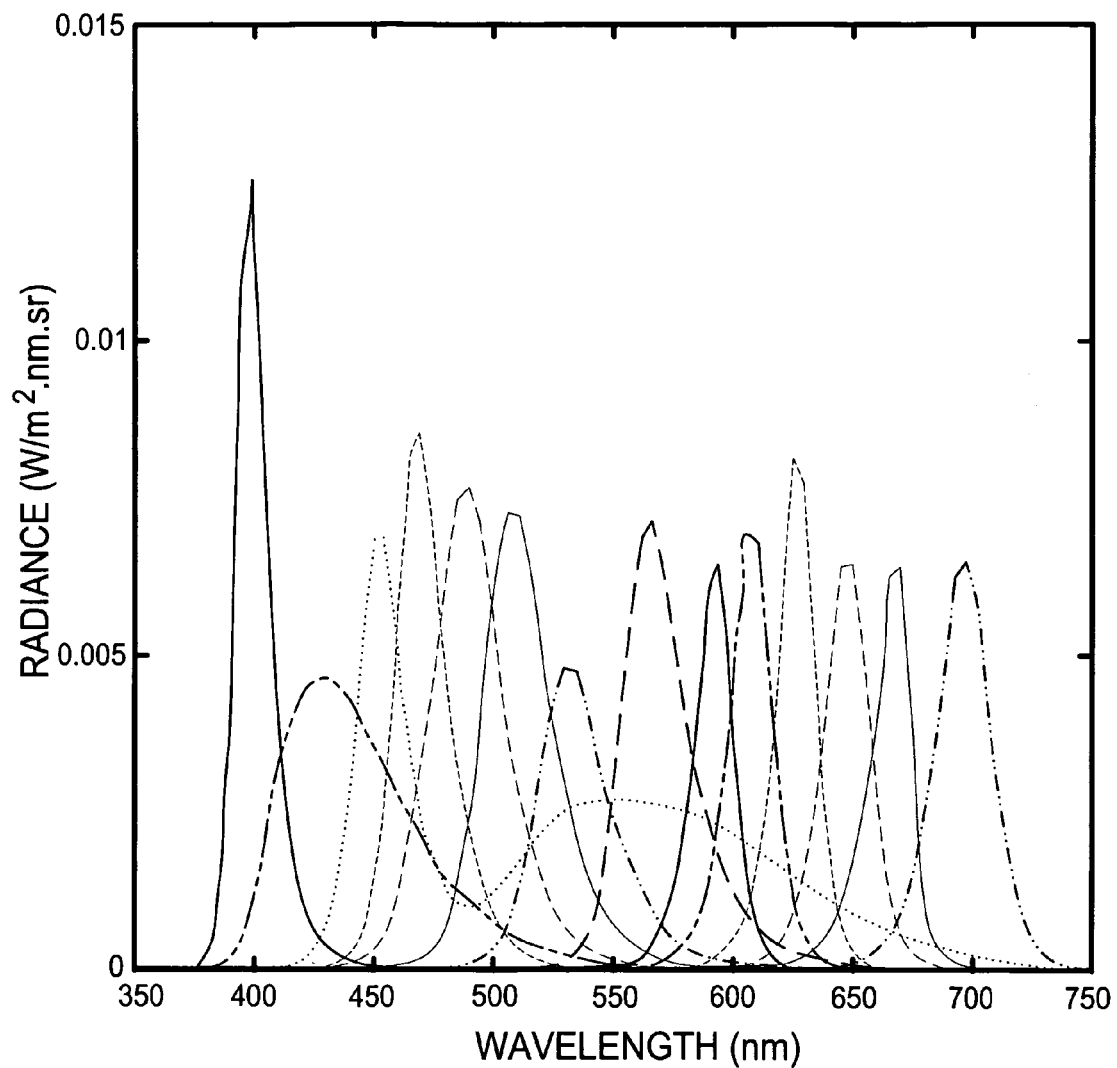

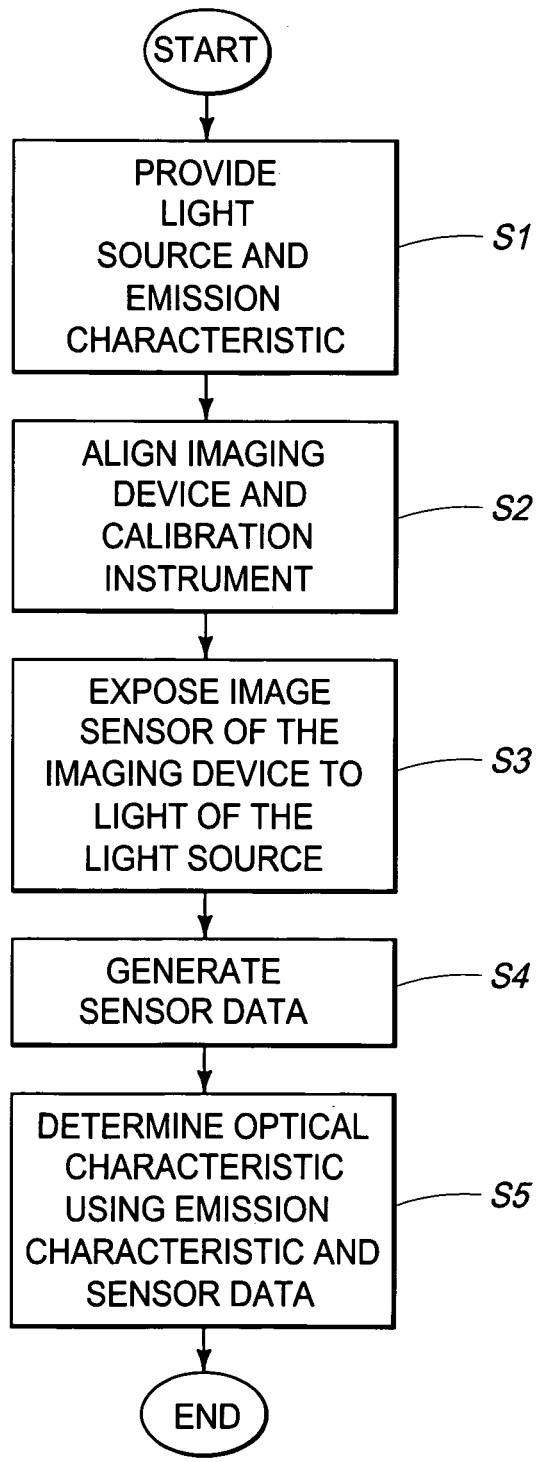

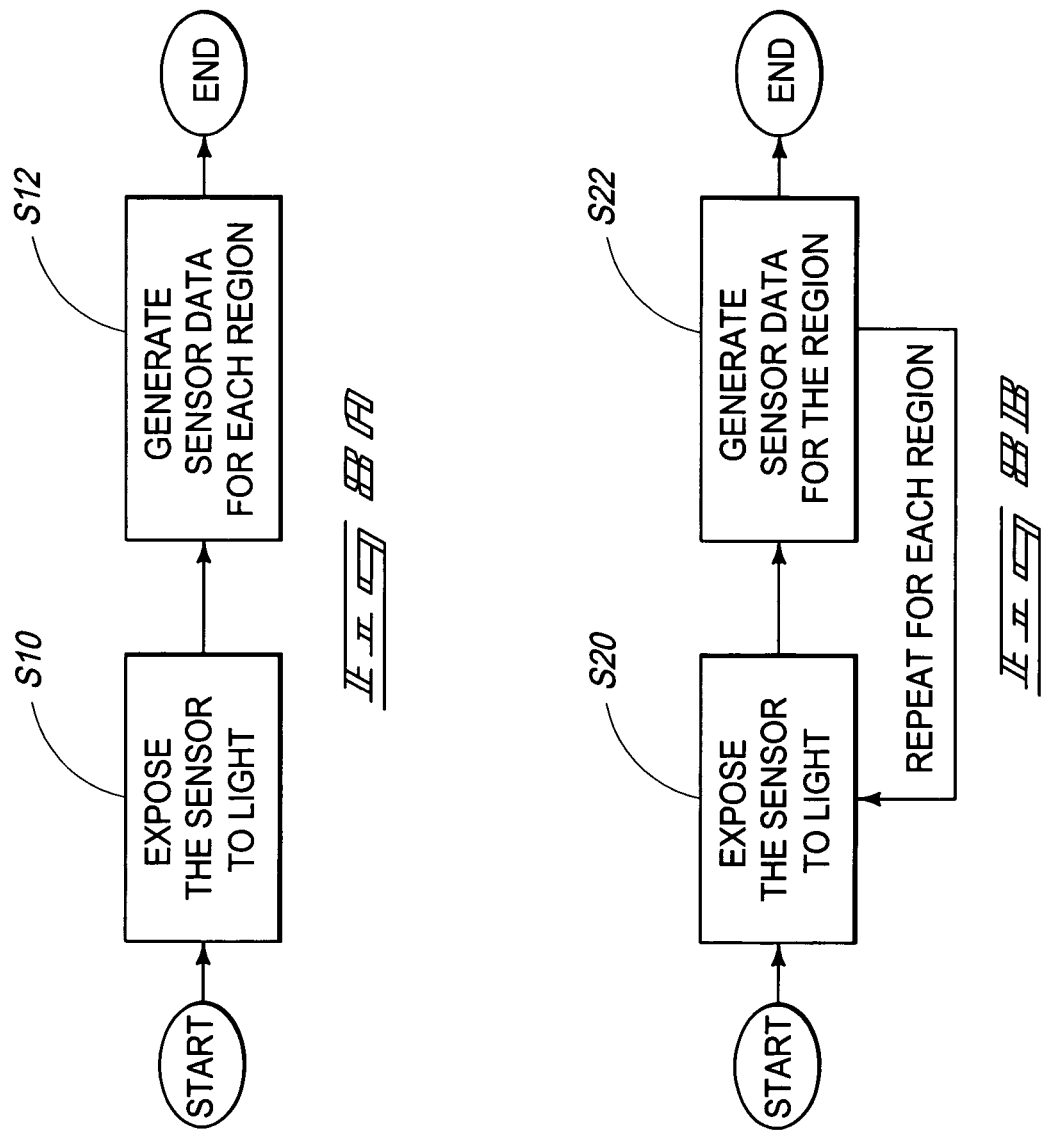

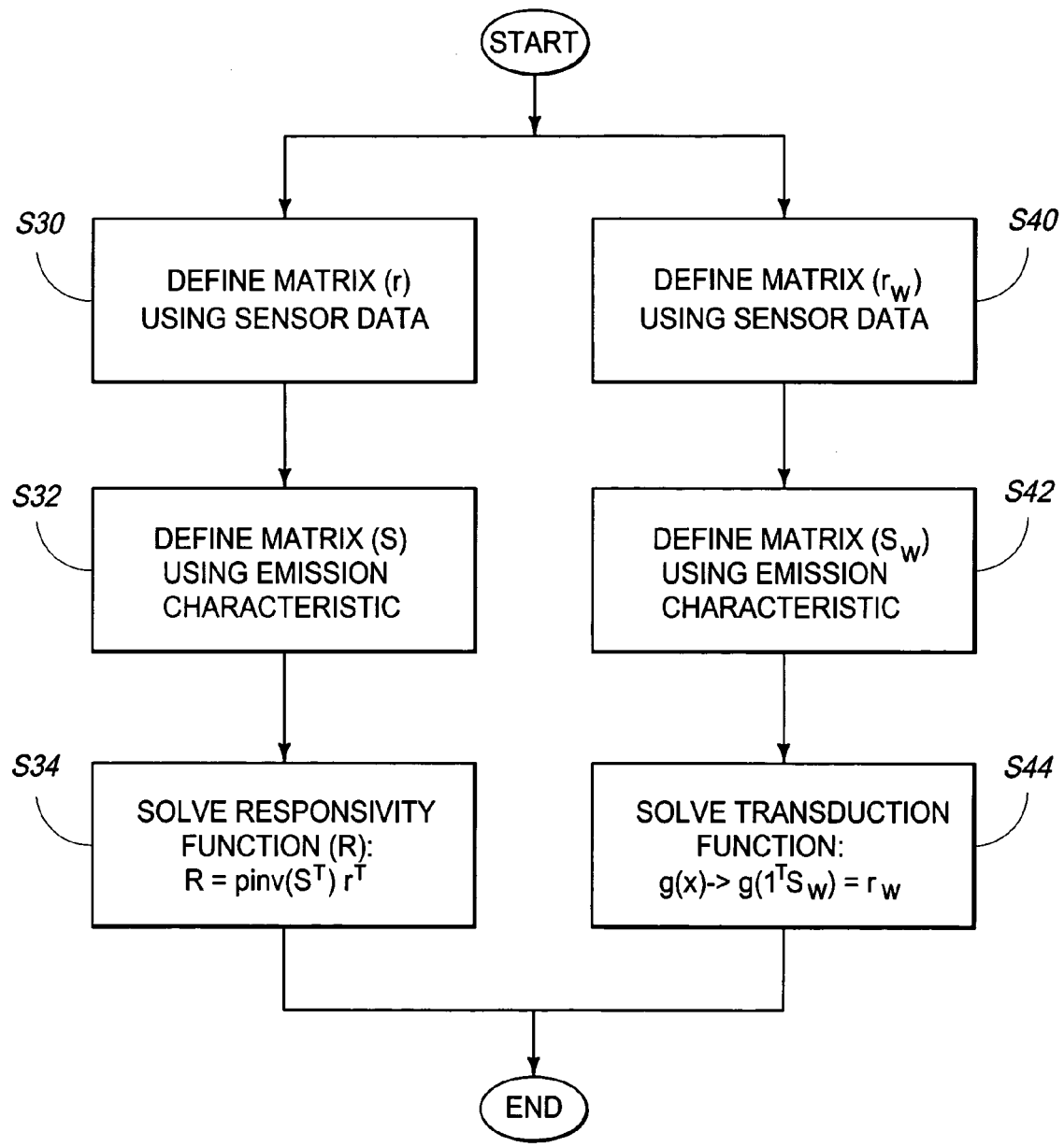

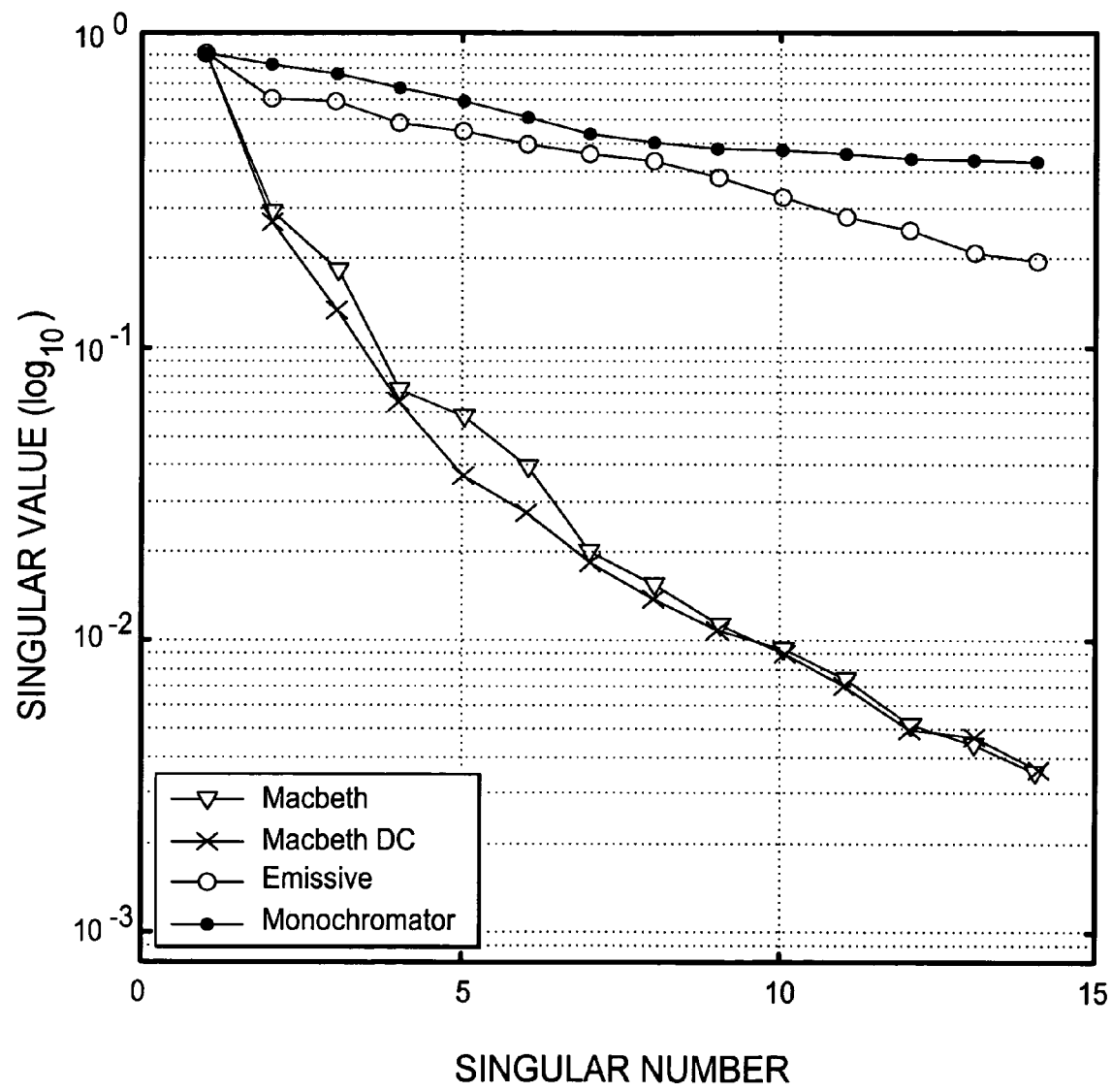

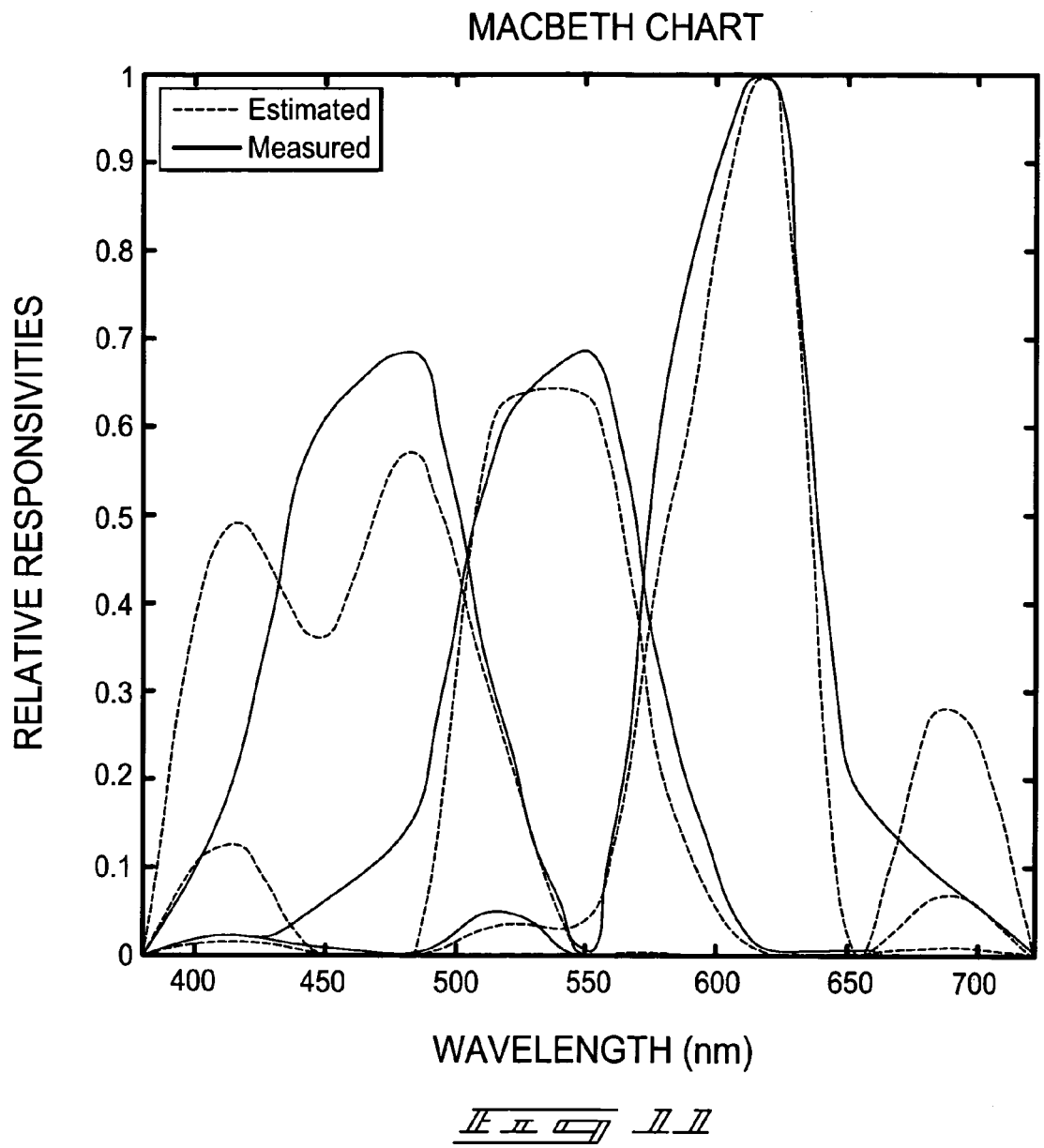

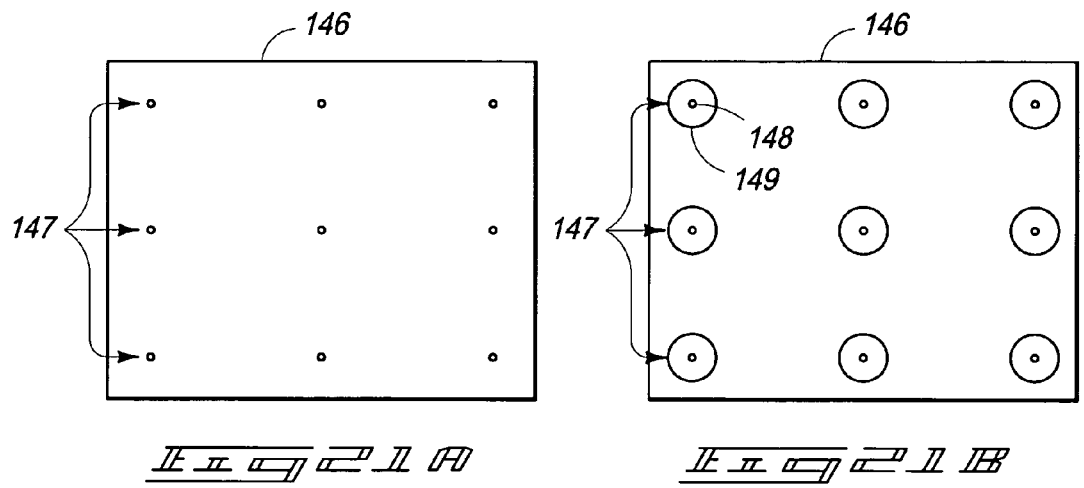
_Fig. 21A_  _Fig. 21B_
_Fig. 22A_  _Fig. 22B_

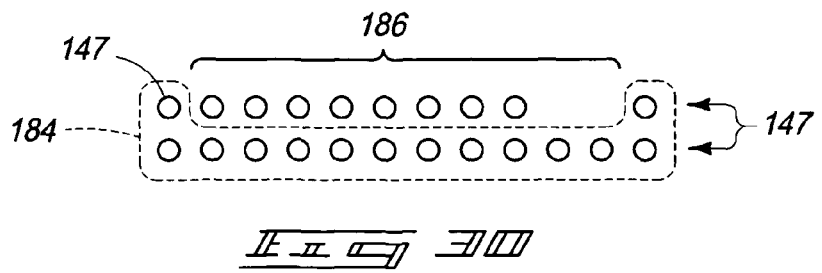
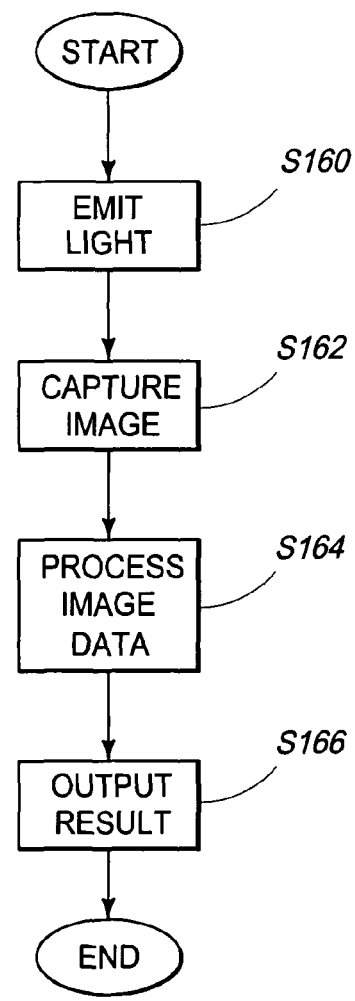

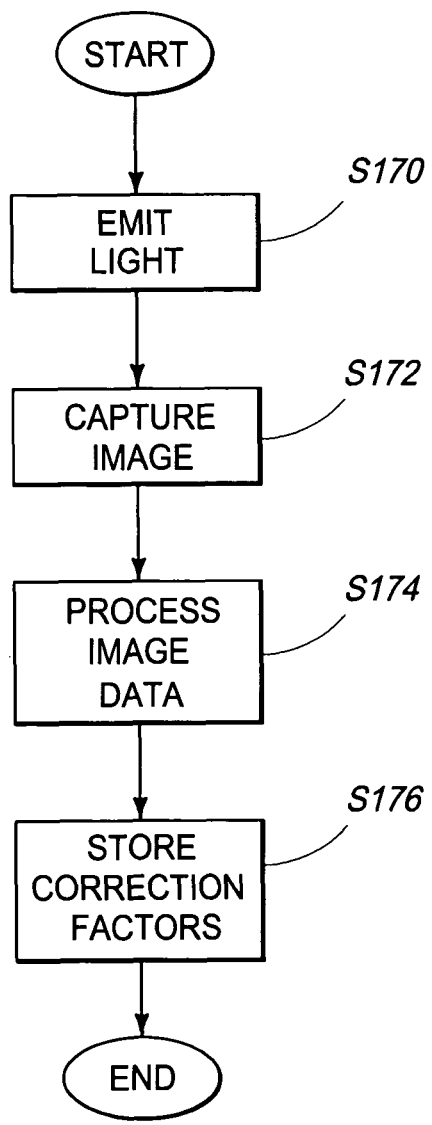

ically conventional analysis systems use different pieces of equipment for performing different tests or analysis.

At least some aspects of the disclosure are related to improved imaging device analysis devices, systems and methods.

IMAGING DEVICE ANALYSIS SYSTEMS AND IMAGING DEVICE ANALYSIS METHODS

RELATED PATENT DATA

This application resulted from a continuation in part of and claims priority to U.S. patent application Ser. No. 10/818, 622, filed on Apr. 5, 2004, entitled "Imaging Device Calibration Methods, Imaging Device Calibration Instruments, Imaging Devices, And Articles Of Manufacture", listing Jeffrey M. DiCarlo as inventor, and the disclosure of which is incorporated by reference herein.

FIELD OF THE DISCLOSURE

Aspects of the disclosure relate to imaging device analysis systems and imaging device analysis methods.

BACKGROUND OF THE DISCLOSURE

Imaging systems of various designs have been used extensively for generating images. Exemplary imaging systems include copiers, scanners, cameras, and more recently digital cameras, and other devices capable of generating images. Color imaging systems have also experienced significant improvements and are increasing in popularity. Color imaging systems may be calibrated to increase accuracy of various image processing algorithms (e.g., illuminant estimation, color correction, etc.), and also to increase the color accuracy of final reproductions.

For example, even identically configured imaging systems may vary from one another due to product tolerances or design variances. Referring to FIG. 1, a graphical representation of relative responsivity versus wavelength is shown for two hundred digital cameras corresponding to the same product. FIG. 1 illustrates the variations in blue, green, and red sensor responsivities of the sampled cameras represented by respective bands 4, 6 and 8. The illustrated bands have widths illustrating the size of the variations between respective cameras although the cameras structurally comprise the same components.

One color calibration technique uses reflective charts. Reflective charts can be utilized to calibrate a camera quickly and they are relatively inexpensive. However, calibrations implemented using reflective charts may not be accurate enough for utilization with cameras. Monochromators, on the other hand, can produce very accurate calibrations of color imaging systems including cameras. However, the calibration procedure with monochromators may take a relatively long period of time to complete, the devices are expensive, and an accurate and controlled light source is typically used.

Other conventional arrangements for analyzing imaging devices have associated drawbacks. For example, one device for shutter testing of an imaging device (e.g., a Camlogix SH-T2) utilizes incandescent lamps and a time calibrated sensor placed in a film plane of a film camera which is less practical for testing of digital cameras. Further, usage of incandescent lamps presents issues with respect to controlling the duration of illumination as well as color and luminance of emitted light. Scanners have been calibrated using white cards which does not permit color calibration in color implementations. Other devices for testing lenses and color (e.g., K-Series TV Optoliner available from Davidson Electronics) utilize a test pattern which is projected onto a sensor plane. These systems have drawbacks of careful set-up and being designed for analyzing television cameras. In addition,

SUMMARY

According to some aspects, exemplary imaging device analysis systems and imaging device analysis methods are described.

According to one embodiment, an imaging device analysis system comprises a light source configured to output light for use in analyzing at least one imaging component of an imaging device, wherein the imaging device is configured to generate images responsive to received light, and processing circuitry coupled with the light source and configured to control the light source to optically communicate the light to the imaging device, wherein the processing circuitry is further configured to access image data generated by the imaging device responsive to the reception, by the imaging device, of the light from the light source and to process the image data to analyze an operational status of the at least one imaging component.

According to another embodiment, an imaging device analysis method comprises outputting infrared light for communication to an imaging device configured to generate images responsive to received light, wherein the imaging device is configured to filter infrared light, accessing image data generated by the imaging device responsive to the light communicated to the imaging device, processing the image data to determine operability of infrared filtering of the imaging device, and indicating the operability of the infrared filtering responsive to the processing.

Other embodiments are described as is apparent from the following discussion.

DESCRIPTION OF THE DRAWINGS

FIG. 2 is an illustrative representation of an exemplary calibration instrument and imaging device according to an illustrative embodiment.

FIG. 3 is a functional block diagram of circuitry of a calibration instrument according to one embodiment.

FIG. 4 is a functional block diagram of circuitry of an imaging device according to one embodiment.

FIG. 5 is an illustrative representation of an optical interface of a calibration instrument according to one embodiment.

FIG. 6 is a graphical representation of radiance versus wavelength for light emitted from the optical interface according to one embodiment.

FIG. 7 is a flow chart representing an exemplary imaging device calibration method according to one embodiment.

FIG. 8a is a flow chart representing exemplary data acquisition according to one embodiment.

FIG. 8b is a flow chart representing exemplary data acquisition according to another embodiment.

FIG. 9 is a flow chart representing exemplary data processing according to one embodiment.

FIG. 10 is a graphical representation comparing exemplary calibration techniques.

FIG. 11 is a graphical representation comparing estimated and measured relative responsivities using a Macbeth chart calibration technique.

FIGS. 21A-21B are illustrative representations of light received by an image sensor according to one embodiment.

FIGS. 22A-22B are graphical representations of light received by an image sensor according to one embodiment.

FIG. 30 is an illustrative representation of light received by an image sensor according to one embodiment.

FIG. 31 is a flow chart of an exemplary method for analyzing exposure speed of an imaging device according to one embodiment.

FIG. 32 is a flow chart of an exemplary method for determining correction factors for an imaging device according to one embodiment.

DETAILED DESCRIPTION

Figure 1:
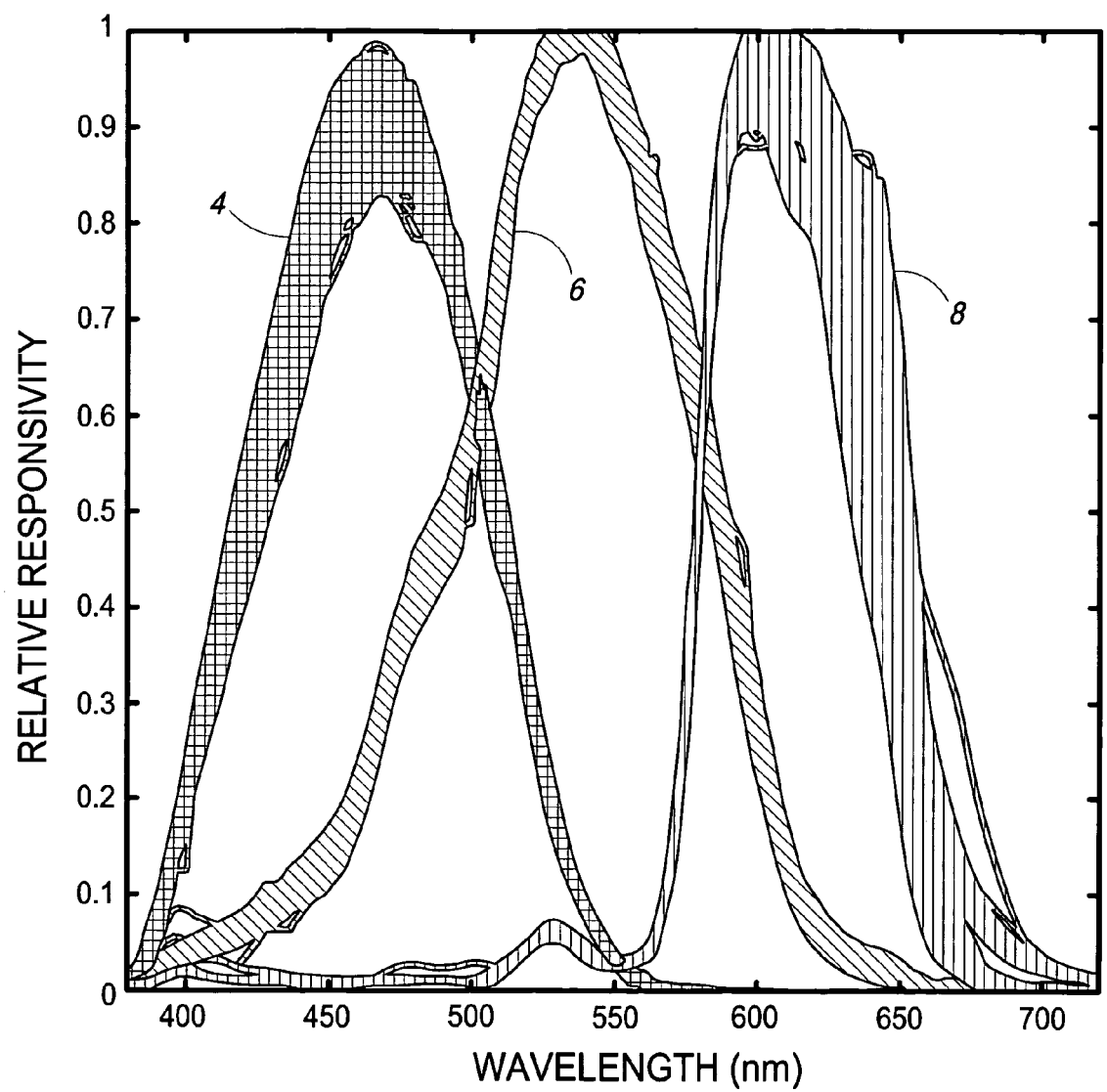
FIG. 1 is a graphical representation of responsivity of a sampling of imaging systems.

At least some aspects of the disclosure provide apparatus and methods which enable fast and accurate calibration of an imaging device. In one embodiment, optical characteristics such as a responsivity function and/or a transduction function of an imaging device may be measured to determine how the associated imaging device responds to input light signals. The determined optical characteristics may be utilized to calibrate the respective imaging device. According to exemplary implementations, emissive light sources as opposed to reflective arrangements are used to determine the optical characteristics and which enable real time fast and relatively inexpensive calibration of an imaging device (e.g., on an assembly line).

Referring to FIG. 2, an imaging system 10 according to one embodiment is shown. The depicted imaging system 10 includes an exemplary imaging device calibration instrument 12 and an imaging device 14. Instrument 12 may be referred to as an emissive calibration instrument in at least one embodiment wherein one or more light source of the instrument 12 emits light which is used for implementing determination of calibration data and calibration of a device 14.

In at least one embodiment, calibration instrument 12 is used to provide calibration data which may be utilized to calibrate imaging device 14. In at least some embodiments described herein, calibration instrument 12 may operate in conjunction with imaging device 14 to provide the calibration data. Calibration data includes optical characteristics such as responsivity and/or transduction functions of the respective imaging device 14 in exemplary embodiments. The calibration data may be utilized to calibrate the individual respective device 14 used to obtain the calibration data. For example, image processing algorithms of imaging device 14 may be tailored to improve imaging operations thereof including the ability of imaging device 14 to produce pleasing and/or faithful images of captured scenes.

Imaging device 14 comprises a color digital camera in the illustrated system. Other configurations of imaging device 14 configured to generate image data responsive to received images are possible (e.g., scanner, color copier, color multiple function peripheral, etc.).

Referring again to calibration instrument 12, the depicted exemplary embodiment includes a light source 20, a light randomizer 22, and an optical diffuser 24. For ease of discussion, exemplary components 20, 22, 24 are shown in exploded view. In typical implementations of calibration instrument 12, components 20, 22, 24 are sealed with respect to one another to prevent the introduction of ambient light into instrument 12. Processing circuitry of calibration instrument 12 may also be provided to control calibration operations as is discussed below with respect to the exemplary circuitry of FIG. 3.

Light source 20 may be embodied in different configurations in different embodiments of calibration instrument 12. Further, light source 20 may be controlled in different embodiments to emit different light simultaneously and/or sequentially. Different light comprises light having different emission characteristics, such as different wavelengths, intensities or spectral power distributions.

For example, the depicted configuration of light source 20 comprises a plurality of regions 26 which are individually configured to emit light having different wavelengths and/or intensities compared with other regions 26. Accordingly, the light of at least some of regions 26 may be both spatially and spectrally separated from light of other regions 26 in the embodiment of calibration instrument 12 in FIG. 2. In some embodiments, the light having different wavelengths and/or intensities may be emitted simultaneously. In other embodiments, some of which are described below, light having different wavelengths and/or intensities may be emitted sequentially.

Individual ones of the regions 26 may comprise one or more light emitting device (not shown). Exemplary light emitting devices include narrow-band devices which provide increased accuracy compared with broad-band reflective patches. Light emitting devices of regions 26 include light emitting diodes (LEDs) and lasers in exemplary embodiments. Other configurations of light emitting devices of regions 26 may be utilized. In one example, individual regions 26 comprise a 3×3 square of light emitting devices configured to emit light of the same wavelength and intensity.

In the depicted exemplary embodiment, light randomizer 22 comprises a plurality of hollow tubes corresponding to respective ones of regions 26 of light source 20. Light randomizer 22 is configured to present substantially uniform light for individual ones of regions 26 to diffuser 24 in the described configuration. Internal surfaces of the tubes of light randomizer may have a relatively bright white matte surface. Other configurations of light randomizer 22 are possible. For example, light randomizer 22 may comprise a single hollow tube in at least one other embodiment of instrument 12 having a single light emitting region described below.

Optical diffuser 24 comprises an optical interface 27 configured to present substantially uniform light for individual ones of regions 26 (and respective regions 28 of optical interface 27 discussed below) to imaging device 14 for use in calibration operations. Other configurations of optical interface 27 apart from the illustrated optical diffuser 24 may be utilized to output light to imaging device 14. An exemplary optical diffuser 24 comprises a translucent acrylic member. The illustrated exemplary optical diffuser 24 is configured to output light corresponding to light emitted by light source 20. For example, the exemplary depicted optical interface 27 comprises a plurality of regions 28 corresponding to respective regions 26 of light source 20. In other embodiments, more or less regions 28 may be provided corresponding to the provided number of regions 26 of light source 20. In at least one embodiment, optical randomizer 22 and diffuser 24 provide different light corresponding to respective ones of regions 28 and for individual ones of the regions 28, the respective light is substantially uniform throughout the area of the respective region 28. In other possible implementations, another optical diffuser may be implemented intermediate light source 20 and light randomizer 22 or within light randomizer 22.

In one embodiment, light randomizer 22 comprises plural aluminum substantially square tubes corresponding to regions 26 of light source 20. The tubes may individually have a length of 2.5 inches between source 20 and interface 27 and square dimensions of 1 inch by 1 inch. The interior surfaces of the tubes may be coated with a white coating such as OP.DI.MA material having part number ODMO1-FO1 available from Gigahertz-Optik. Diffuser 24 may comprise a plurality of pieces of white translucent acrylic material having part number 020-4 available from Cyro Industries with dimensions of 1 inch by 1 inch comprising individual ones of regions 28 and individually having a thickness of ⅛ inch. Other configurations or embodiments are possible.

Referring to FIG. 3, exemplary circuitry 30 of calibration instrument 12 is shown. The depicted circuitry 30 includes a communications interface 32, processing circuitry 34, storage circuitry 36, light source 20 and a light sensor 38. More, less or alternative circuit components may be provided in other embodiments.

Communications interface 32 is configured to establish communications of calibration instrument 12 with respect to external devices. Exemplary configurations of communications interface 32 include a USB port, serial or parallel connection, IR interface, wireless interface, or any other arrangement capable of uni or bidirectional communications. Any appropriate data may be communicated using communications interface 32. For example, as described below, communications interface 32 may be utilized to communicate one or more emission characteristic of light source 20 and/or one or more determined optical characteristics of the respective imaging device 14 to be calibrated.

In one embodiment, processing circuitry 34 may comprise circuitry configured to implement desired programming. For example, processing circuitry 34 may be implemented as a processor or other structure configured to execute executable instructions including, for example, software and/or firmware instructions. Other exemplary embodiments of processing circuitry include hardware logic, PGA, FPGA, ASIC, state machines, and/or other structures. These examples of processing circuitry 34 are for illustration and other configurations are possible.

Processing circuitry 34 may be utilized to control operations of calibration instrument 12. In one embodiment, processing circuitry 34 is configured to automatically control the timing of emission of light from the instrument 12 (e.g., control the timing to simultaneously and/or sequentially emit light having different wavelengths and/or intensities from instrument 12). In one embodiment, processing circuitry 34 may automatically control the timing and the emission of the light without user intervention.

Storage circuitry 36 is configured to store electronic data and/or programming such as executable instructions (e.g., software and/or firmware), calibration data, or other digital information and may include processor-usable media. In addition to the calibration data described above, additional exemplary calibration data may include one or more emission characteristics of light emitted using optical interface 27 of calibration instrument 12. As discussed below, exemplary emission characteristics include spectral power distributions (SPDs) of light emitted at optical interface 27 according to one embodiment. Spectral power distributions include emission characteristics including wavelengths of the emitted light and associated intensities of the light for the respective wavelengths of light.

Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Light source 20 may be configured in exemplary arrangements as described above. For example, light source 20 may be configured to emit light of different wavelengths and/or intensities in one embodiment. The different wavelengths and/or intensities may be defined by a plurality of regions 26 as described above. In another embodiment, light source 20 is configured to emit light of a substantially constant wavelength and/or intensity and a plurality of spatially separated filters positioned downstream of light source 20 and corresponding to regions 26 may be utilized to provide light of any different desired wavelengths and/or intensities. In another embodiment described below, light source 20 may be configured to sequentially emit different light using a single region. Other arrangements are possible.

Light sensor 38 is optically coupled with light source 20 and is configured to receive emitted light therefrom. In one example, light sensor 38 is implemented as a photodiode although other configurations are possible. One or more light sensor 38 may be positioned within light randomizer 24 in some embodiments (e.g., one light sensor 38 may be positioned in light randomizer 22 implemented as a single hollow tube in one exemplary configuration described herein). In other arrangements having plural regions 26, light sensor 38 may be optically coupled via an appropriate light pipe (not shown) or other configuration with the regions 26 and corresponding to emitted light having different wavelengths and/or intensities.

Light sensor 38 is configured to monitor emitted light for calibration purposes of calibration instrument 12 in one arrangement. For example, at least some configurations of light source 20 may provide light which drifts in wavelength and/or intensity over time. Light sensor 38 may be utilized to monitor the light and indicate to a user that instrument 12 is out of calibration and service is desired. For example, calibration instrument 12 may be considered to be out of calibration if intensities of different wavelengths of light vary with respect to one another. Exemplary recalibration of calibration instrument 12 may include re-determining the emission characteristics (e.g., spectral power distributions) of light emitted from the optical interface 27.

Referring to FIG. 4, imaging device 14 is illustrated in an exemplary configuration as a digital camera. As mentioned previously, imaging device 14 may be embodied in other configurations to generate images from scenes or received light. Imaging device in the illustrated configuration includes processing circuitry 40, storage circuitry 42, a strobe 44, an image sensor 46, a filter 48, optics 50, and a communications interface 52.

In one embodiment, processing circuitry 40 may be embodied similar to processing circuitry 34 described above and comprise circuitry configured to implement desired programming. Other exemplary embodiments of processing circuitry include different and/or alternative hardware to control operations of imaging device 14 (e.g., control strobe 44, optics 50, data acquisition and storage, processing of image data, communications with external devices, and any other desired operations). These examples of processing circuitry 40 are for illustration and other configurations are possible.

Storage circuitry 42 is configured to store electronic data (e.g., image data) and/or programming such as executable instructions (e.g., software and/or firmware), or other digital information and may include processor-usable media similar to the above-described storage circuitry 36 in at least one embodiment.

Strobe 44 comprises a light source configured to provide light for usage in imaging operations. Processing circuitry 40 controls operation of strobe 44 in the described embodiment. Strobe 44 may be disabled, utilized alone or in conjunction with other external sources of light (not shown).

Image sensor 46 is configured to provide raw image data of a plurality of raw images. The raw image data comprises digital data corresponding to a plurality of pixels of the raw images formed by image sensor 46. For example, the raw images comprise bytes corresponding to the colors of red, green and blue at respective pixels in an exemplary RGB application. Other embodiments may utilize or provide other color information. Image sensor 46 may comprise a plurality of photosensitive elements, such as photodiodes, corresponding to the pixels and configured to provide the raw digital data usable for generating images. For example, image sensor 46 may comprise a raster of photosensitive elements (also referred to as pixel elements) arranged in 1600 columns by 1280 rows in one possible configuration. Other raster configurations are possible. Photosensitive elements may individually comprise charge coupled devices (CCDs) or CMOS devices in exemplary configurations. In one specific example, image sensor 46 may utilize X3 technology in sensor arrangements available from Foveon, Inc.

Filter 48 is provided upstream of image sensor 46 to implement any desired filtering of light received by imaging device 14 prior to sensing by image sensor 46. For example, in one embodiment, filter 48 may remove infrared light received by imaging device 14.

Optics 50 includes appropriate lens and an aperture configured to focus and direct received light for creation of images using image sensor 46. Appropriate motors (not shown) may be controlled by processing circuitry 40 to implement desired manipulation of optics 50 in one embodiment.

Communications interface 52 is configured to establish communications of imaging device 14 with respect to external devices (e.g., calibration instrument 12). Exemplary configurations of communications interface 52 include a USB port, serial or parallel connection, IR interface, wireless interface, or any other arrangement capable of uni or bidirectional communications. Communications interface 52 may be configured to couple with and exchange any appropriate data with communications interface 32 of calibration instrument 12 or other external device. For example, communications interface 52 may be utilized to receive one or more emission characteristic of light source 20 and/or one or more determined optical characteristic of the respective imaging device 14. Further, interface 52 may output sensor data generated by image sensor 46 and which may be used to implement image processing operations including determination of optical characteristics of imaging device 14 as described below.

Referring to FIG. 5, an exemplary configuration of optical interface 27 is shown. The depicted optical interface 27 corresponds to the embodiment of calibration instrument 12 shown in FIG. 2 and includes a plurality of regions 28 of different light having different wavelengths and/or intensities.

In the illustrated configuration, optical interface 27 includes plural rows 60 of colored regions and a single row 62 of white regions. More, less or regions of other wavelengths and/or intensities may be provided in other embodiments of optical interface 27.

Colored region rows 60 provide plural regions 28 of light having different wavelengths. For example, in the depicted embodiment, rows 60 include regions 28 sequentially increasing in wavelength at increments of 25 nm from ultraviolet light (375 nm) to infrared light (725 nm) providing light which is spectrally and spatially separated. In the illustrated example, row 62 comprises a plurality of regions W1-W5 of the same relative spectral power distribution and which increase in intensity. The relative intensity of the white patches may be 0.01, 0.03, 0.10, 0.30, and 1 for respective ones of regions W1-W5.

According to the exemplary embodiment of FIG. 5, the number of light emitting devices and/or the drive currents for the light emitting devices may be varied between respective regions 28 to provide the desired spectral power distributions of emitted light. Other configurations are possible in other embodiments.

In one embodiment, the regions 28 of FIG. 5 may be numbered 1 to 15 sequentially from left to right for each of the rows starting with the top row and continuing to the bottom row. Exemplary light emitting devices may comprise LEDs available from Roither Lasertechnik and have the following part numbers for the respective regions 28: (1) 380D30, (5) HUBG-5102L, (13) ELD-670-534, (14) ELD-700-534, and (15) ELD-720-534. Remaining exemplary light emitting devices may comprise LEDs available from American Opto and have the following part numbers for the respective regions 28: (2) L513SUV, (3) L513SBC-430NM, (4) L513NBC, (6) L513NBGC, (7) L513NPGC, (8) L513UGC, (9) L513NYC-E, (10) L513UOC, (11) L513NEC, (12) L513TURC, and (W1-W5) L513NWC.

In this example, the drive currents may be constant for the light emitting devices of all of the regions 28 for rows 60 (e.g., 18-20 mA) and the number of light emitting devices per region 28 are varied according to: (1) 4, (2) 1, (3) 14, (4) 2, (5) 4, (6) 3, (7) 1, (8) 27, (9) 3, (10) 2, (11) 1, (12) 2, (13) 2, (14) 2, and (15) 1. The number of light emitting devices for individual ones of the regions 28 of row 62 may be the same (e.g., four) and the following exemplary drive currents may be used: 0.2, 0.6, 2, 6 and 20 mA for respective ones W1-W5 of region 28. The above example is for illustration and other configurations or variations are possible.

As described further below, utilization of optical interface 27 shown in FIG. 5 including regions 28 of varying wavelength and/or intensity enables simultaneous determination of responsivity and transduction functions of imaging device 14, for example, via a single exposure of the device 14 to light emitted from optical interface 27 using imaging device 14. Other configurations of optical interface 27 are possible as discussed herein (e.g., providing an optical interface wherein only wavelength or intensity are varied between regions 26, providing an optical interface with only a single emission region for sequentially emitting light of the same wavelength and/or intensity, etc.).

Provision of light of different wavelengths by calibration instrument 12 may be utilized to determine a responsivity function of imaging device 14. In the embodiment of optical interface 27 illustrated in FIG. 5, plural regions 26 of rows 60 may simultaneously emit light for determination of the responsivity function via a single exposure thereto by imaging device 14 due to the spatially and spectrally separated regions 26 of rows 60.

Referring to FIG. 6, the emission of light via optical interface 27 (i.e., and received by imaging device 14) may be optimized to facilitate determination of the responsivity function of the imaging device 14 being calibrated. The graphical representation of FIG. 6 illustrates spectral power distributions of light emitted by light source 20 and provided at regions 28 of optical interface 27 which facilitate the responsivity analysis of imaging device 14. The spectral power distributions include exemplary radiance values for the regions 28 of optical interface 27 depicted in FIG. 5 increasing in wavelength from left to right along the x-axis.

As mentioned above, the number of light emitting devices of source 20 may be varied for individual regions 26 to provide different intensities. In another embodiment, the number of light emitting devices may be the same for individual regions 26 and the drive currents of the light emitting devices of the respective regions 26 may be varied to provide desired intensities. Other arrangements may be used to provide desired spectral power distributions. In one embodiment, the intensities may be selected to approximate the exemplary spectral power distributions depicted in FIG. 6 during calibration of instrument 12 itself. Once the appropriate drive currents of the light emitting devices of respective regions 26 (or other configuration parameters) are determined, instrument 12 may be calibrated to drive the light emitting devices using the determined drive currents or parameters. In one embodiment, the light emitting devices of a respective region 26 may be driven using the same drive current while drive currents used to drive light emission devices of different regions 26 may be different. Other configurations apart from varying the number of light emitting devices and/or drive currents for respective regions 26 may be used in other embodiments as mentioned above.

Further, the spectral power distribution of light emitted at optical interface 27 using the drive currents may be determined following calibration of instrument 12. In one example, the spectral power distribution of light emitted at optical interface 27 may be measured using a spectral radiometer. The measured spectral power distribution of calibration instrument 12 may be stored as an emission characteristic of calibration instrument 12 using storage circuitry 36 or other appropriate circuitry and subsequently utilized during calibration operations of one or more imaging device 14. New drive currents and/or spectral power distributions may be determined during recalibration of instrument 12.

Emission characteristics may also be provided and stored for individual regions 28 of row 62. As mentioned previously, at least some of the regions 28 may be configured to vary intensity of light for a given wavelength of light (e.g., the regions of row 62). Data regarding the intensities of light corresponding to regions 28 may be stored as an emission characteristic for subsequent usage in calibration of one or more imaging device 14. The intensity data may also be extracted from the spectral power distributions of light from regions 28 within row 62.

Referring to FIG. 7, an exemplary method for implementing calibration of an imaging device 14 using calibration instrument 12 is shown. Other methods are possible including more, less or alternative steps.

At a step S1, an embodiment of calibration instrument 12 having a light source is provided along with at least one emission characteristic of light emitted from the light source.

At a step S2, the imaging device 14 to be calibrated is aligned with calibration instrument 12.

At a step S3, image sensor 46 of imaging device 14 is exposed to light emitted from the light source.

At a step S4, image sensor 46 senses the light and generates sensor data which is indicative of the sensing by the image sensor 46.

At a step S5, appropriate processing circuitry determines an optical characteristic of imaging device 14 using the emission characteristic and the sensor data. The optical characteristic may be utilized to calibrate imaging device 14. The exemplary method of FIG. 7 may be repeated for other imaging devices 14.

Referring to FIG. 8a, a flow chart illustrates an exemplary method for data acquisition during calibration of an associated imaging device 14 using the calibration instrument 12 described with reference to FIG. 2.

At a step S10, the imaging device to be calibrated is brought into alignment to receive light emitted from the optical interface of the calibration instrument 12. Once aligned, the light source 20 of calibration instrument 12 is controlled to emit light at regions 28 of optical interface 27. Imaging device 14 is configured to provide the optical interface 27 into focus and to expose the image sensor 46 to light from calibration instrument 12 (e.g., takes a photograph) to receive the light emitted from optical interface 27.

At a step S12, sensor data is generated by image sensor 46 responsive to the exposing in step S10. In one embodiment, individual pixels of image sensor 46 are configured to provide sensor data comprising RGB values. Pixel locations of image sensor 46 may correspond to regions 28 of optical interface 27. Accordingly, a plurality of pixels of image sensor 46 may be identified which correspond to individual ones of regions 28. RGB values from individual ones of the pixels which correspond to respective individual regions 28 and may be averaged using processing circuitry 34, 40 or other desired circuitry in one embodiment to provide a single averaged RGB value for each of regions 28. According to one embodiment, the sensor data comprising averaged RGB values may be utilized for calibration of imaging device 14 as described below.

Data acquisition operations are described below with respect to another embodiment of calibration instrument 12. Calibration instrument 12 according to the other presently described embodiment includes an optical interface having a single region (not shown) to output light for calibration of imaging device 14. For example, as opposed to arranging light emitting devices of different wavelengths and/or intensities according to regions 26 as described above, light emitting devices of the light source having different wavelengths or intensities may be distributed around an entirety of the area of the region of the optical interface.

In one embodiment, it is desired for the light emitting devices of the light source to provide a substantially uniform distribution of light across an entirety of the area of the region of the optical interface. In one possible implementation, individual ones of the light emitting devices comprising twenty different wavelengths or intensities may be positioned adjacent to one another in sequence in both rows and columns to provide a substantially uniform emission of light across the region of the optical interface for individual ones of the wavelengths on intensities. Other patterns of distribution of the light emitting devices are possible.

In one operational embodiment, only the light emitting devices of a common wavelength or intensity may be controlled to emit light at any given moment in time. According to this embodiment, the light emitting devices of a first wavelength of light may be controlled to emit respective light substantially uniform across the area of the region. Thereafter, the light emitting devices for the remaining wavelengths may be sequentially individually controlled to emit light of the respective wavelengths in sequence providing temporal and spectral separation of the emitted light. If present, light emitting devices having different intensities for a given wavelength may thereafter be individually configured to emit light in sequence to enable transduction calibration operations described further below. Accordingly, in one embodiment, the light emitting devices of respective wavelengths or intensities may be sequentially configured to emit respective light. More specifically, light emitting devices having a common wavelength may be sequentially controlled to individually emit light starting at 375 nm and progressing to 725 nm and followed by the emission of light from light emitting devices configured to provide light of a common wavelength and varied intensity from W1 to W5. Imaging device 14 may sense emitted light for each of the respective emitted wavelengths 375 nm-725 nm and intensities W1-W5 of light in one embodiment. Sensor data is then provided by imaging device 14 for each of the wavelengths and intensities of light.

Referring to FIG. 8b, exemplary data acquisition operations according to the second above-described embodiment having an optical interface 27 with a single region providing sequentially emitted different light are described.

At a step S20, the calibration instrument is controlled to emit light having a single wavelength. The image sensor of the imaging device to be calibrated is exposed to the emitted light.

At a step S22, an average RGB value for the respective wavelength may be determined from pixel sensor data of the image sensor using processing circuitry 34, 40 or other desired circuitry.

Thereafter, the processing may return to step S20 whereupon the instrument controls the emission of light of the next wavelength enabling generation of sensor data for the respective wavelength using the imaging device 14. The process of FIG. 8b may be repeated to provide sensor data comprising averaged RGB values in the described embodiment for as many different wavelengths or intensities of light emitted using the calibration instrument.

The above-described embodiments are provided to illustrate exemplary data acquisition techniques for implementing imaging device calibration operations. Other data acquisition methods and/or apparatus may be used in the other embodiments.

Referring to FIG. 9, the acquired data is processed following acquisition to determine calibration data of the imaging device 14. Exemplary processing includes determining calibration data comprising optical characteristics (e.g., responsivity and/or transduction functions) for the respective imaging device 14 according to one embodiment. As mentioned above, processing circuitry 34, 40 and/or other appropriate processing circuitry may perform data acquisition operations. Similarly, processing circuitry 34, 40 and/or other appropriate processing circuitry may be utilized to process the acquired data for example as shown in FIG. 9. Further, data acquisition and processing may be performed by the same or different processing circuitry.

In the illustrated exemplary processing of FIG. 9, optical characteristics including responsivity and transduction functions of the imaging device 14 are determined. In other embodiments, only one of responsivity or transduction functions, and/or alternative characteristics of the imaging device 14 are determined. Further, additional optical characteristics or other information for use in calibration of imaging device 14 may be determined. For example, responsivity and/or transduction functions may be further processed by appropriate processing circuitry 34, 40 or other processing circuitry (not shown). For example, a color correction matrix, an illuminant estimation matrix and/or other information may be derived from the responsivity and transduction functions.

Steps S30-S34 illustrate exemplary processing for determining a responsivity function of imaging device 14.

Steps S40-S44 illustrate exemplary processing for determining a transduction function of imaging device 14. Other processing may be utilized according to other arrangements (not shown).

At step S30, the sensor data obtained from image sensor 46 including the averaged RGB values described above for the respective individual regions 28 of rows 60 in the described embodiment may define a matrix r.

At step S32, the emission characteristic comprising spectral power distributions (SPDs) of the regions 28 in the described embodiment may define a matrix S.

At step S34, the responsivity function R may be determined using matrices r, S and the equation R=pinv($S^T$)$r^T$ in the described example.

The transduction function may be determined in parallel with the determination of the responsivity function in the illustrated example.

Referring to step S40, the sensor data from image sensor 46 including the averaged RGB values for the respective individual regions 28 of row 62 in the described embodiment may define a matrix $r_w$.

At step S42, the emission characteristic comprising spectral power distributions of the regions 28 in the described embodiment may define a matrix $S_w$.

At step S44, the transduction function g(x)–>g($1^T S_w$)=$r_w$ may be solved using matrices $r_w$, $S_w$ in the described example.

The above-described methods of FIG. 9 may be used to determine one or more optical characteristic for respective individual ones of the imaging devices 14 which provided the respective sensor data indicative of the circuitry of the respective imaging devices 14, and accordingly, the above-described processes may be performed for individual ones of imaging devices 14 to be calibrated to determine the respective appropriate one or more optical characteristic for the respective devices 14. The above-described methods of FIG. 9 are exemplary and other processing or methods may be utilized to determine responsivity and/or transduction functions or other optical characteristics of imaging device 14 in other embodiments.

Once determined, the optical characteristics may be used to calibrate the respective imaging devices 14. For example, optical characteristics comprising responsivity and transductance functions may be used to increase the accuracy of image processing algorithms (e.g., illuminant estimation and color correction) of respective imaging devices 14, and also to increase the color accuracy of final reproductions.

As described herein in one embodiment, the exemplary apparatus and/or methods may be used to determine whether components of imaging device 14 are defective (e.g., sensor 46, filter 48, etc.). For example, the ability of the respective imaging devices 14 to remove infrared or other light may also be monitored using calibration instruments 12 discussed above and configured to emit infrared or other light. For example, a filter of imaging device 14 and configured to remove certain light (e.g., infrared) may be identified as defective if the sensor data generated by the respective imaging device 14 responsive to light emitted from optical interface 27 of calibration instrument 12 (and including infrared or other desired light) indicates that the received light included emitted infrared or the other light which was not removed by filter 48.

In one embodiment, the determined optical characteristics may be communicated to respective imaging devices 14 which implement appropriate calibration if the optical characteristics were determined using processing circuitry 34 of calibration instrument 12 (or other processing circuitry external of imaging devices 14). Alternately, processing circuitry 40 of imaging devices 14 may determine the optical characteristics of the respective devices 14. In another embodiment, the calibration may be performed externally of imaging devices 14 using the determined optical characteristics and the calibrated image processing algorithms may be subsequently provided to the respective imaging devices 14. In yet another embodiment, processing circuitry 40 of imaging devices 14 may be configured to utilize the determined (e.g., internally or externally) optical characteristics to implement the calibration internally of the imaging devices 14. In sum, any appropriate processing circuitry may be configured to generate one or more optical characteristic for the respective imaging devices 14 and the same or other processing circuitry may utilize the one or more optical characteristic to implement the calibration.

Referring to FIG. 10, a graphical representation is shown of singular value decomposition of different calibration methods including exemplary emissive aspects described herein compared with usage of reflective patches (Macbeth and MacbethDC) and a monochromator.

The relatively high and constant singular value decomposition using the exemplary emissive calibration instrument 12 of FIG. 2 and described herein is similar to results achieved with a monochromator and greatly exceed the results achieved through the Macbeth and MacbethDC reflective patches wherein the respective curves are not constant and have relatively rapidly decreasing slopes. The accuracy of the calibration methods depends on how spectrally correlated the reflective patches or the light emitting devices are to each other. More correlated patches or light emitting devices produce less accurate calibrations. This is the case because calibration techniques invert an image formation equation to compute the camera responsivity functions. When spectrally correlated patches or light emitting devices are inverted, noisy estimates of the camera responsivity functions result. The singular values of the reflectance functions of patches or the spectral power distributions of light emitting devices indicate the accuracy of a given method. The more singular values which are greater than 0.01 (anything less may be considered too noisy), the more accurate the method (see e.g., FIG. 10). Basically, the number of singular values indicates the number of patch colors or light emitting devices that contribute to the resulting calibration.

Figure 12:
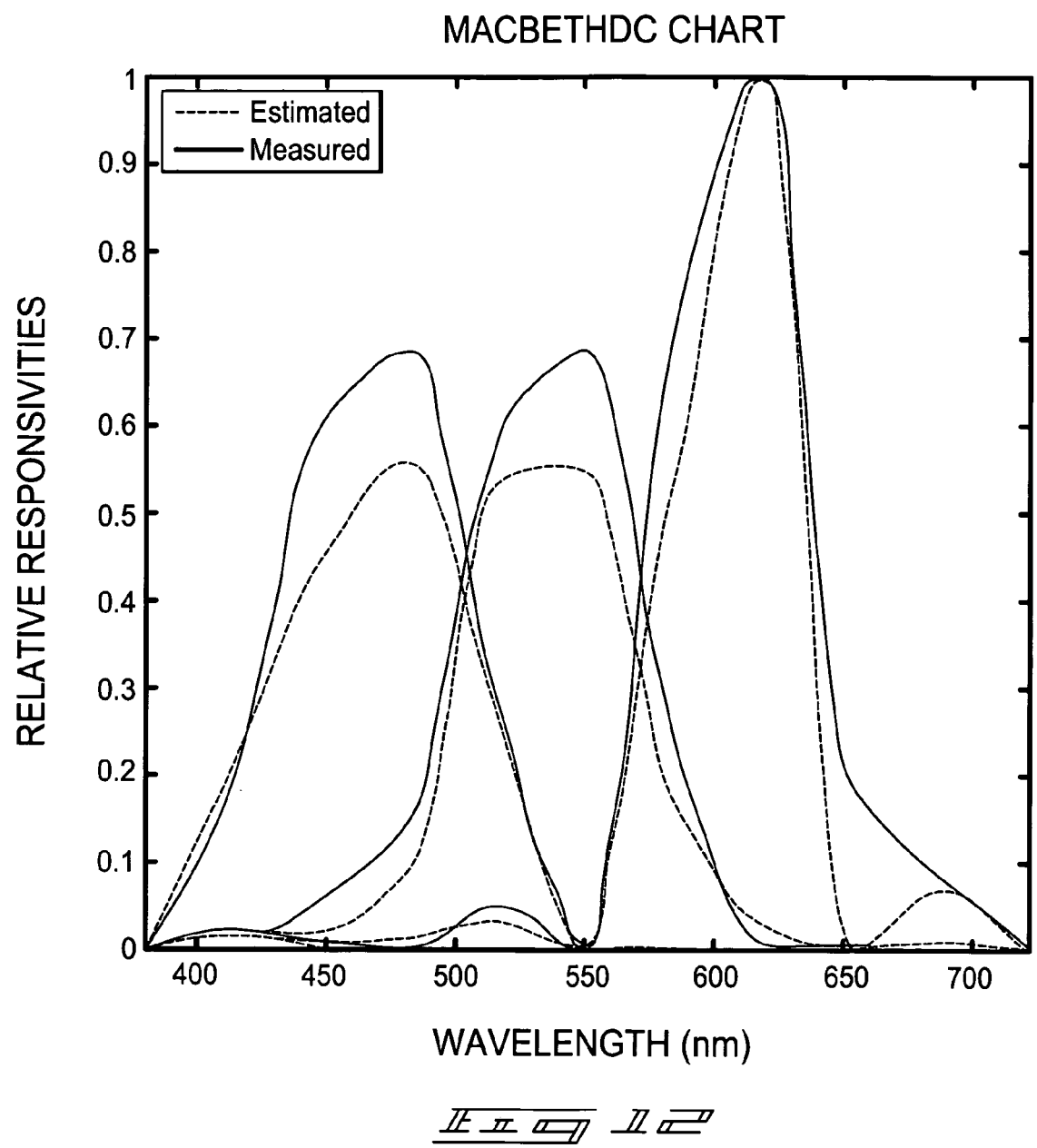
FIG. 12 is a graphical representation comparing estimated and measured relative responsivities using a MacbethDC chart calibration technique.
Figure 13:
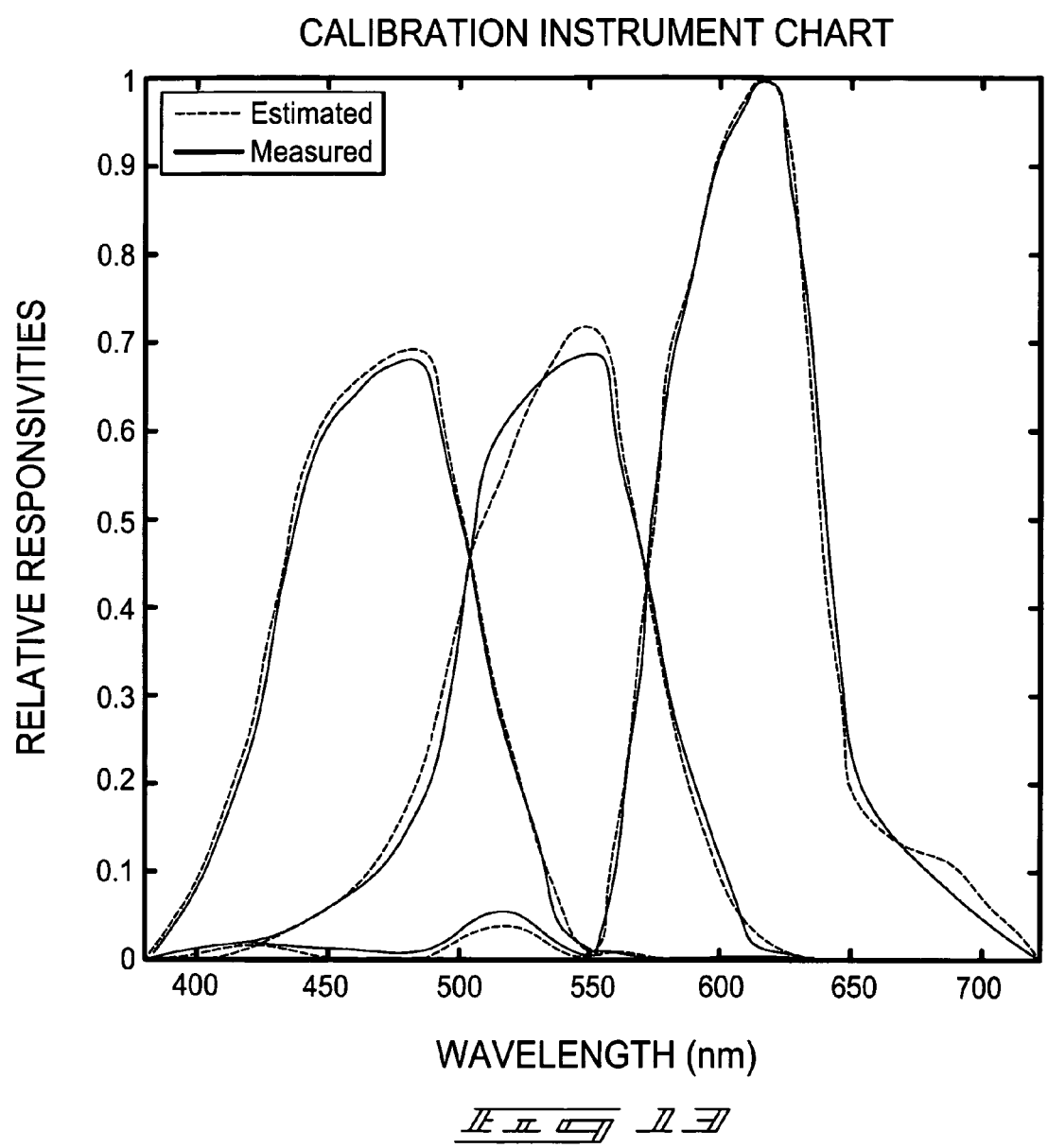
FIG. 13 is a graphical representation comparing estimated and measured relative responsivities using an emissive calibration instrument according to one embodiment.

Further, with respect to FIGS. 11-13, exemplary relative responsivities determined using Macbeth reflective patches (FIG. 11), MacbethDC reflective patches (FIG. 12) and the exemplary emissive calibration instrument 12 of FIG. 2 (FIG. 13) for a D1 digital camera available from Nikon are individually shown with respect to graphs measured using a monochromator. It is clear from a comparison of FIGS. 11-13 that the calibration instrument 12 of FIG. 2 provides increased accuracy of determining relative responsivities of a given imaging device 14 compared with usage of reflective patches (e.g., Macbeth and MacbethDC).

Table 1 compares the calibration procedures using reflective charts, the calibration instrument 12 of FIG. 2 and a monochromator. The calibration instrument 12 of FIG. 2 provides the shortest calibration time for a given imaging device 14 (i.e., slightly shorter than the reflective chart) and no uniformity of an external light source is required as with the reflective chart, and hours shorter than a monochromator (i.e., colors may be measured spatially in the configuration of FIG. 2 instead of temporally as with the monochromator). Calibration instrument 12 has the shortest calibration time of the compared devices since external sources of light do not have to be made uniform (e.g., the exemplary instrument 12 emits desired light itself).

TABLE 1

| Reflective chart | Calibration Instrument | Monochromator |
| --- | --- | --- |
| 1. Uniformly illuminate the chart using an ambient source. | 1. Turn on the device. | 1. Set monochromator to a specified wavelength and bandwidth. |
| 2. Take a photograph of the chart | 2. Take a photograph of the device. | 2. Take a photograph of the light exiting the monochromator. |
| 3. Run software to calibrate. | 3. Run software to calibrate | 3. Measure the power level of |

TABLE 1-continued

| Reflective chart | Calibration Instrument | Monochromator |
|---|---|---|
| | | the light exiting the monochromator.<br>4. Repeat steps 1–3 for each wavelength of the visible spectrum.<br>5. Run software to calibrate. |

Table 2 compares approximate cost of devices configured to implement the above-described three calibration methods.

TABLE 2

| Reflective chart | Calibration Instrument | Monochromator |
|---|---|---|
| $50–$350 (retail) | $200–$400 (est. retail) | $5,000–$20,000 (retail) |

Table 3 compares the number of singular values of the three methods and devices including the calibration instrument of FIG. 12. Other embodiments of calibration instrument 12 may include more or less wavelengths and/or intensities of light as desired. For example, embodiments of instrument 12 described above include twenty types of different light. In other embodiments, any appropriate number of different types of light (wavelength and/or intensity) may be used sequentially, in plural regions, or according to other appropriate schemes.

TABLE 3

| Reflective chart | Calibration Instrument | Monochromator |
|---|---|---|
| approximately 4 | 15–20 (depends on number of emissive sources) | >50 |

Reflective charts because they have broadband, highly-correlated patch colors, only contribute approximately 4 measurements that can be used for calibration. This is typically not adequate for calibrations of imaging devices 14 comprising cameras. The monochromator, on the other hand, produces over 50 calibration measurements because it typically uses narrow-band sources. Hence, the monochromator produces calibration results of increased accuracy, but the calibration time is relatively long and the cost is relatively expensive. The exemplary calibration instrument 12 of FIG. 2 has an associated 15-20 measurements, for example, which produces more than adequate calibration results for typical imaging devices 14 (e.g., digital cameras), but it does not suffer the cost and long calibration times of the monochromator or utilize external illumination as used with reflective patches.

Accordingly, at least some aspects of the disclosure allow for quick, accurate, and relatively inexpensive determination and calibrations of responsivity and transduction functions of imaging devices 14 and may be utilized to calibrate imaging devices on the manufacturing line in at least one implementation. As discussed above, imaging devices 14 of the same model or using the same type of components may have different responsivity and transduction functions due to sensor and/or color filter manufacturing variations. Calibration instruments 12 described herein may be used for determining optical characteristics of the devices 14 and calibrating the devices 14 before the imaging devices 14 are shipped to a customer or dealer. The relatively quick and accurate calibrations may improve the overall color reproduction quality of individually calibrated imaging devices 14.

Calibration instruments 12 or methods discussed herein may also be used by professional or prosumer photographers for calibration of high-end imaging devices 14. It is believed that such calibrations would improve the overall color reproduction quality of the resulting images generated by such calibrated imaging devices 14. At least some such calibration aspects may be focused to a more professional market inasmuch as some calibration aspects utilize raw image data from the imaging device 14 and typically, raw image data is provided by imaging devices 14 developed for these markets.

At least some aspects described below disclose exemplary analysis operations of an imaging device. Some of the described embodiments permit testing and measurement of optical and electronic characteristics of an imaging device in order to check quality control, assembly, and software or firmware programming, and/or to measure and tune a device in the field. For example, in addition to the above described analysis operations, additional analysis may be performed with respect to focus operations of the imaging device, filtering of an infrared cutoff filter, chromatic aberrations, pin cushion and barrel distortion, exposure speed, and determination of gain maps in exemplary embodiments. In some embodiments, analysis systems described herein may be used by imaging device testers with access to manual controls (e.g., in an interactive mode), may implement analysis in an automated fashion (e.g., self-service kiosk), or at a fabrication facility to verify operation of imaging devices being manufactured. Analysis operations may be performed to test programming of an imaging pipeline of an imaging device by exposure of the imaging device to known color values which may be tracked through the pipeline for debugging or other purposes. At least some embodiments are described with respect to stand-alone implementations for interfacing with imaging devices. In other embodiments, the analysis systems or methods may be implemented internally of a device such as a printer, computer, copier, etc.

Figure 14:
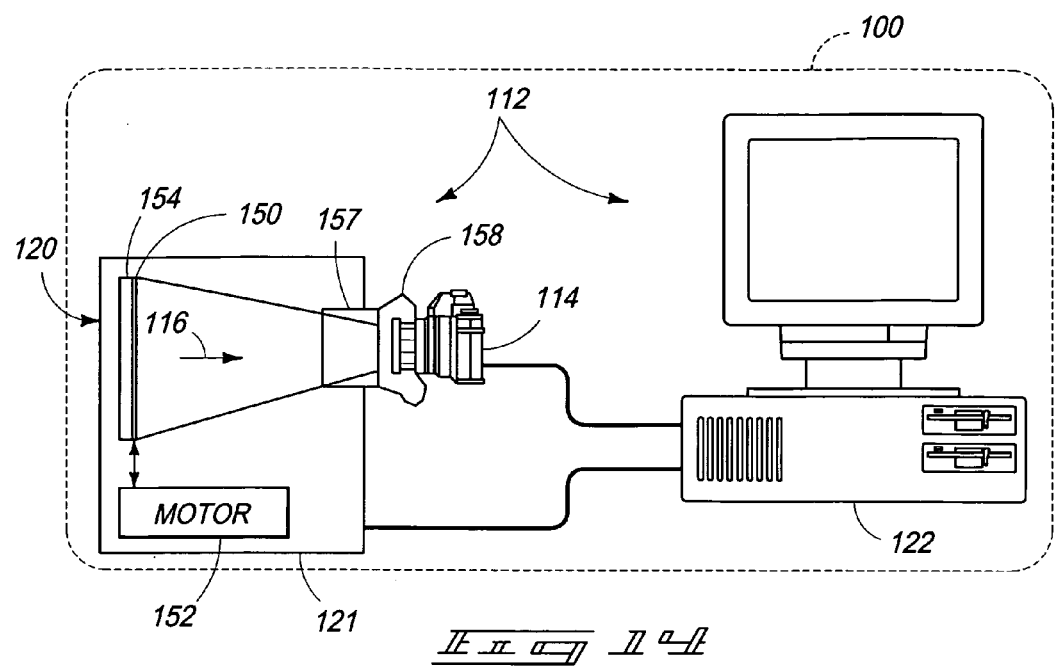
FIG. 14 is an illustrative representation of an imaging system according to one embodiment.

Referring to FIG. 14, another embodiment of an imaging system 100 is illustrated. The imaging system 100 includes an imaging device analysis system 112 and an imaging device 114. In one embodiment, imaging system 100 may be configured similarly to the above-described imaging system 10. For example, in some embodiments, analysis system 112 may be configured the same as or similar to calibration instrument 12 and imaging device 114 may be configured the same as or similar to imaging device 14, and for example, may comprise a camera, digital camera, video recorder, scanner, copier, multiple function peripheral or other configuration capable of capturing images and generating images. In some embodiments, imaging device 114 may comprise a color device capable of capturing color information of images and/or generating digital data indicative of the captured color images.

The illustrated analysis system 112 includes an analysis device 120 and a computer 122 in one embodiment. In some embodiments, analysis device 120 is configured to emit light 116 which may be captured by imaging device 114 in the form of digital information or on a substrate, such as film. Light 116 may be emitted within a housing 121 configured to reduce the presence of ambient light not emitted from the analysis device 120. Imaging device 114 may be optically coupled with an interior of the housing 121 to receive the emitted light 116. In one embodiment, analysis system 112 and imaging device 114 are provided in a temperature controlled facility to reduce effects of temperature upon analysis operations. In one example, an HVAC system may be used to maintain an interior of housing 121 and/or an environment about housing 121 at a substantially constant temperature. In some arrangements, imaging device 114 may be positioned within housing 121 during analysis.

Analysis device 120 and/or computer 122 (e.g., implemented as a personal computer) may be individually configured using at least some of the circuitry as described with respect to FIG. 3 in one embodiment. More specifically, analysis device 120 and/or computer 122 may individually comprise a communications interface, processing circuitry, storage circuitry, a light source, and/or a light sensor configured similar to such above-described components of FIG. 3 in one embodiment. Additional details of exemplary embodiments are described herein and a co-pending U.S. patent application entitled "Imaging Device Analysis Systems And Imaging Device Analysis Methods", listing Steven W. Trovinger, Glen Eric Montgomery, and Jeffrey M. DiCarlo as inventors, having Ser. No. 11/054,209; and a co-pending U.S. application entitled "Imaging Device Analysis Methods, Imaging Device Analysis Systems, And Articles Of Manufacture", listing Jeffrey M. DiCarlo and Casey Miller as inventors, having Ser. No. 11/054,193, and the teachings of both applications are incorporated herein by reference.

For example, still referring to FIG. 14, analysis device 120 may additionally include one or more mask 150, a motor 152, an emission assembly 157 and bellows 158. In addition, analysis device 120 and/or computer 122 may individually comprise more or less components or circuitry or alternative configurations (e.g., light source 154 described herein).

In addition, imaging device 114 may be configured similar to the embodiment of FIG. 4 in one implementation and may include processing circuitry, a strobe, optics (e.g., lens), a filter, an image sensor, and/or a communications interface configured similar to such above-described imaging components. Other embodiments of imaging device 114 are possible and may include more or less components or circuitry.

Other embodiments of analysis system 100 are possible. For example, computer 122 may be omitted in some arrangements, and if appropriate, analysis device 120 and/or imaging device 114 may implement functionality otherwise provided by computer 122. More specifically, if present, computer 122 may provide a user interface including a display for depicting information for a user and an input device configured to receive input from a user. Computer 122 may additionally implement and/or control operations of analysis device 120 and/or imaging device 114 to enable analysis of the imaging device 114. For example, processing circuitry of computer 122 may control light emissions of analysis device 120 and image capture operations of imaging device 114 to capture images of the emitted light. For example, in one embodiment, computer 122 is configured to initiate analysis operations of imaging device 114 and may synchronize light emission operations of analysis device 120 with image capture operations or other operations of imaging device 114. In one embodiment, the appropriate processing circuitry may automatically control and implement the analysis operations (e.g., without input from a user).

Processing circuitry of computer 122 may communicate information to and/or receive communications from analysis device 120 and/or imaging device 114. Processing circuitry may process received data, control the user interface to illustrate test results to a user, provide calibration data for use in imaging device 114, and implement other desired aspects of the analysis system 100.

As mentioned above, the above-described functions of computer 122 may be implemented using analysis device 120 and/or imaging device 114 in arrangements wherein computer 122 is omitted. In embodiments wherein computer 122 is omitted, analysis device 120 and/or imaging device 114 may individually directly communicate with and/or control the other device, interface with a user and perform other desired functions and operations to enable analysis operations.

Mask 150 may be selectively positioned intermediate light source 154 and the imaging device 114 to implement analysis of imaging device 14. In one embodiment, a plurality of masks 150 are provided to implement different analysis operations with respect to imaging device 114. Masks 150 control the emission of one or more light beams using light 116 from light source 154 to implement analysis operations. As described below, different masks 150 may be used which correspond to different emissions of light from light source 154. In some analysis embodiments, no mask 150 is utilized intermediate light source 154 and imaging device 114. Motor 152 may be used to selectively move one or more mask 150 with respect to a position intermediate light source 154 and imaging device 114 responsive to control from computer 122 in one embodiment.

Emission assembly 157 may comprise a diffuser configured to mix light emitted by light source 154. For example, light source 154 may comprise a plurality of light emitting devices (e.g., light emitting diodes) which are configured to emit light 116. In some analysis operations, plural light emitting devices correspond to a common wavelength of light. Emission assembly 157 may mix the light from the different light emitting devices to remove frequency variations and provide the light to imaging device 114 of a substantially single wavelength without the wavelength variations at a moment in time. In other embodiments described herein, light emitting devices of light source 154 emit light 116 of different wavelengths. In some embodiments, emission assembly 157 may be moved out of an optical path of light 116 by a user, motor 152, or other means.

In accordance with some analysis aspects, it is desired to emit at least some of the light beams of the respective different wavelengths from emission assembly 157 having substantially the same intensity for communication to imaging device 114. In addition, light source 154 may emit light beams of different intensity. The light beams of different wavelengths or intensities may be emitted simultaneously and/or sequentially corresponding to respective different analysis operations to be performed.

In exemplary arrangements described below, it may be desired to emit light using groups of light emitting devices located at different spatial locations. In one embodiment, the light source 154 may have a rectangular surface area and a plurality of light emitting devices of the same or different wavelengths may be positioned across substantially an entirety of the surface area. As described below, different ones or groups of the light emitting devices including spatially spaced devices or groups may be used for different analysis operations. In another embodiment, the light emitting devices may be moved to desired locations to perform different analysis operations. In another embodiment, a plurality of different configurations of light sources 154 may be used tailored to the respective analysis operations to be performed. Details regarding exemplary analysis operations are discussed below in accordance with some embodiments.

It may be desired to minimize or prevent the entry of ambient light (i.e., light not emitted by analysis device 120) into imaging device 114 during analysis operations. In one embodiment, an optical interface (e.g., output of emission assembly 157) may have a sufficient size (e.g., 2" diameter) which is larger than a light receiving member (e.g., light receiving surface of a lens) of imaging device 114. Accordingly, the optical interface may be configured to entirely cover a lens of imaging device 114 being analyzed to reduce or minimize the entry of ambient light into the imaging device 114. The optical interface of the emission assembly 157 and the lens of imaging device 114 may be brought into contact with one another or otherwise closely optically coupled during analysis according to one aspect. Bellows 158 may also be provided about an optical coupling of analysis device 120 and imaging device 114 to reduce the entry of ambient light into imaging device 114.

According to exemplary analysis embodiments, light beams of the same or different wavelengths and/or intensities may be emitted from optical interface. The light beams may be emitted simultaneously or at different moments in time. Imaging device 114 may be controlled corresponding to the emission of light 116 to, for example, capture images, lock focus without image capture, or perform other operations for implementing analysis operations. Other operational aspects of analysis system 112 or imaging device 114 are possible according to other analysis aspects.

Figure 15:
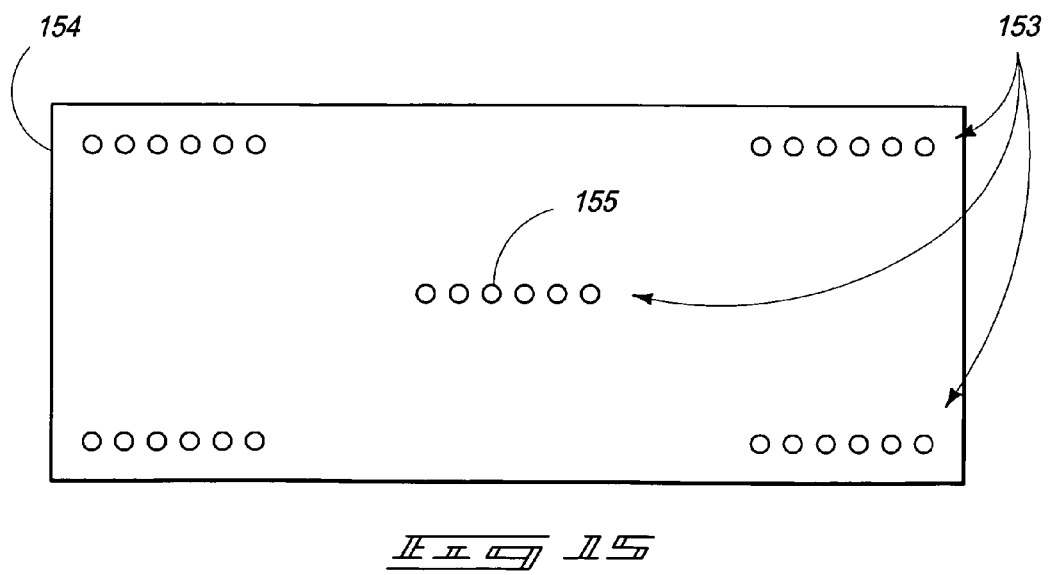
FIG. 15 is an illustrative representation of a light source according to one embodiment.
Figures 16A, 16B:
FIGS. 16A-16B are graphical representations of light received by an image sensor of an imaging device according to one embodiment.
Figure 17:
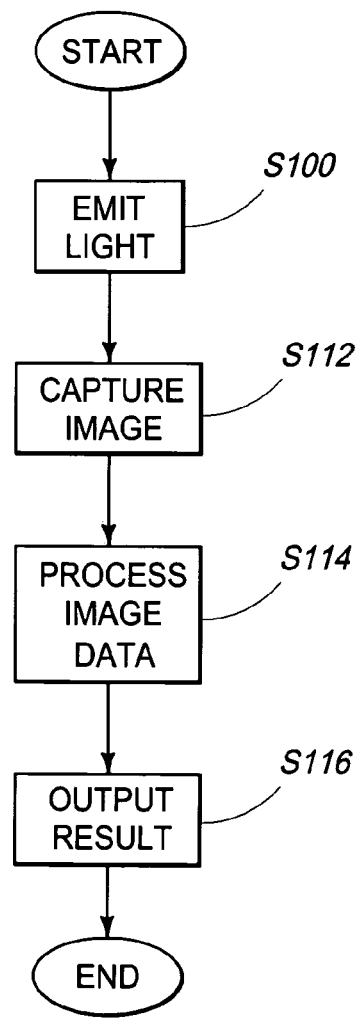
FIG. 17 is a flow chart of an exemplary method for analyzing infrared filtering operations of an imaging device according to one embodiment.

Referring now to FIGS. 15-17, exemplary operations with respect to analysis of infrared filtering by imaging device 114 are described. The exemplary described aspects test for the presence and proper installation of an infrared cutoff filter in one embodiment.

FIG. 15 illustrates an exemplary configuration of light source 154 to enable analysis of the infrared filtering of imaging device 114 according to one embodiment. FIG. 15 illustrates a plurality of groups 153 of light emitting devices 155 which may be provided by light source 154. As mentioned above, in one embodiment, light emitting devices 155 may cover substantially an entirety of the surface area of light source 154 and the depicted groups 153 are merely shown to indicate which ones of the light emitting devices 155 are used to implement infrared cutoff filter analysis operations according to the described embodiment. In another embodiment, FIG. 15 represents the actual layout of the light emitting devices 155 of the light source 154. Plural groupings 153 may be used at different spatial locations as shown in the example to enable analysis operations of imaging device 114 at different spatial locations. No mask is utilized in the exemplary described infrared analysis and other embodiments of light source 154 are possible to implement the analysis.

Each of the groupings 153 may simultaneously emit light from respective light emitting devices 155 of different wavelengths and including light having wavelengths below and above 700 nm in one operational embodiment. For example, progressing from left to right, the light emitting devices 155 may emit light having wavelengths of 660 nm, 740 nm, 860 nm, 890 nm, 935 nm, and 1030 nm in one implementation.

Referring to FIGS. 16A-16B, output of pixel locations of an image sensor corresponding to one of the groupings 153 is shown. The output is shown for plural light sensing devices (e.g., charge coupled devices) of an image sensor of imaging device 114 in one embodiment. The examples show results of a properly functioning infrared cutoff filter of imaging device 114 (FIG. 16A) and a defective infrared cutoff filter (FIG. 16B). In particular, imaging device 114 may be controlled to capture light emitted from the groupings 153 of light source 154. If the infrared cutoff filter is working properly as shown in FIG. 16A, the pixel values of respective sensing devices of the image sensor corresponding to the leftmost light emitting device 155 indicate the reception of the light of 660 nm while the pixel values of the sensing devices corresponding to the remaining light emitting devices 155 and wavelengths above 700 nm reflect little or no reception of light. If the infrared cutoff filter is not working properly as shown in FIG. 16B, the pixel values of respective sensing devices of the image sensor corresponding to light emitting devices 155 of the respective group 153 indicate the reception of all of the emitted light including infrared light. Appropriate action may be taken if the infrared cutoff filter is not working properly, for example, by replacing the filter.

Referring to FIG. 17, an exemplary process is illustrated for analyzing the operation of infrared filtering. Appropriate processing circuitry of analysis system 112 and/or imaging device 114 may control or implement at least some of the depicted steps in one embodiment. Other methods are possible including more, less or alternative steps.

At a step S110, the light source is configured to emit light at positions at least corresponding to the light emitting devices of FIG. 15 and including light within and outside of the infrared spectrum.

At a step S112, the image sensor of the imaging device is controlled to capture an image corresponding to the emitted light thereby producing image data.

At a step S114, the image data of the image sensor may be processed. In an exemplary embodiment wherein the positioning of the imaging device 114 with respect to the light source 154 is controlled or known, the respective pixel locations of the image sensor corresponding to locations of light emitting devices 155 are known and the image data may be read directly for the appropriate pixel locations. If the pixel locations are not known, an algorithm may be executed to locate the pixels comprising the desired image data for each of the light emitting devices 155 and generated responsive to the emitted light. An exemplary search algorithm is described in U.S. Pat. No. 5,371,690, the teachings of which are incorporated herein by reference. Once the pixel locations are identified, the image data may be accessed by the processing circuitry. The processing circuitry may compare intensity information of the individual respective pixel locations resulting from light from each of the light emitting devices 155 with respect to a threshold to determine whether the infrared cutoff filter is working properly. For each of the light beams of devices 155, an average of image data from adjacent pixels or peak values may be used for comparison in illustrative embodiments. The sensitivity of the light sensing devices may be different for different wavelengths of light. In exemplary embodiments, the processing circuitry may use different thresholds for data provided by pixel locations which received different wavelengths of light or normalize the output of the light sensing devices for comparison to a single threshold.

At a step S116, the results of the analysis may be outputted for communication to a user. For example, computer 122 may display graphs similar to FIGS. 16A-16B and/or provide a pass/fail indication of the infrared filtering operations.

Figures 18, 19:
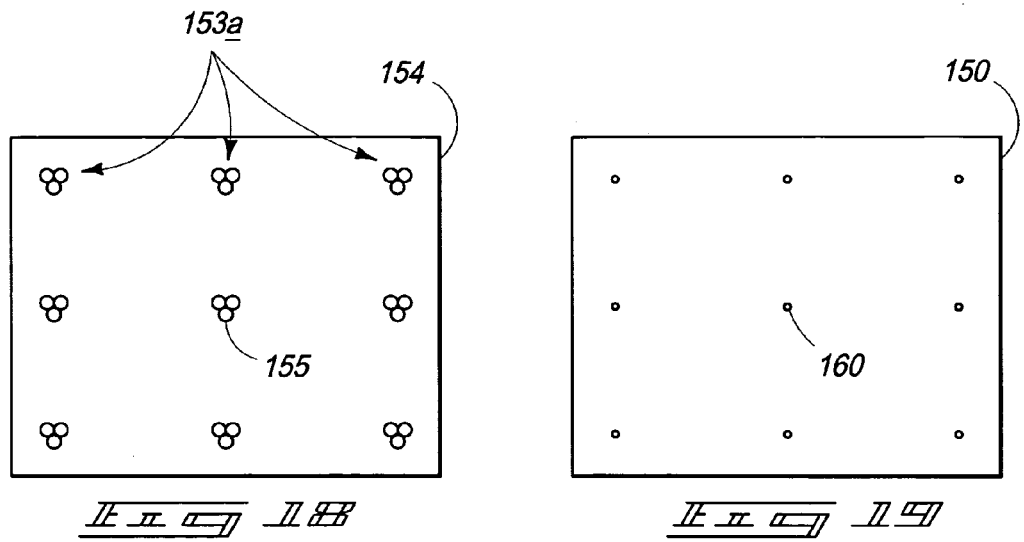
FIG. 18 is an illustrative representation of a light source according to one embodiment.
FIG. 19 is an illustrative representation of a mask according to one embodiment.

Referring now to FIGS. 18-22B, exemplary operations for analysis of chromatic aberrations of imaging device 114 are described. In one embodiment, chromatic aberration is measured across a field of view of the imaging device 114. FIG. 18 illustrates an exemplary configuration of light emitting devices 155 of light source 154 used to implement the described analysis and FIG. 19 illustrates an exemplary configuration of a mask 150 which corresponds to the devices 155 used in FIG. 18 according to one embodiment. Computer 122 may control motor 152 to move mask 150 into an appropriate position intermediate light source 154 and emission assembly 157 when chromatic aberration analysis is to be performed.

As shown in FIG. 18, groupings 153a may be provided at different spatial locations to enable analysis operations of imaging device 114 using the different spatial locations. Individual ones of the groupings 153a include light emitting devices 155 configured to emit light of different wavelengths (e.g., blue 400-450 nm, green 500 nm, and red 650-700 nm in one embodiment).

Two dimensions (i.e., width and height) of mask 150 are shown in FIG. 19 and define an area. The area corresponds to an area of light emitting devices of light source 154 in one embodiment. For example, as mentioned above, light source 154 may include a plurality of light emitting devices 155 across an area (e.g., which may correspond to the areas shown in FIGS. 18-19 although only devices 155 of the groupings 153a are shown in FIG. 18). Mask 150 includes a plurality of apertures 160 corresponding to respective groupings 153a of light emitting devices 155. Apertures 160 may comprise pinholes configured to pass light corresponding to light emitting devices 155 aligned with and located behind apertures 160. Groupings 153a are arranged in one embodiment such that the light from the individual devices 155 is mixed when viewed through mask 150. Other arrangements could include LEDs with multiple diodes in the same package, usage of a diffuser with mask 150, and/or other mixing implementations.

Figure 20:
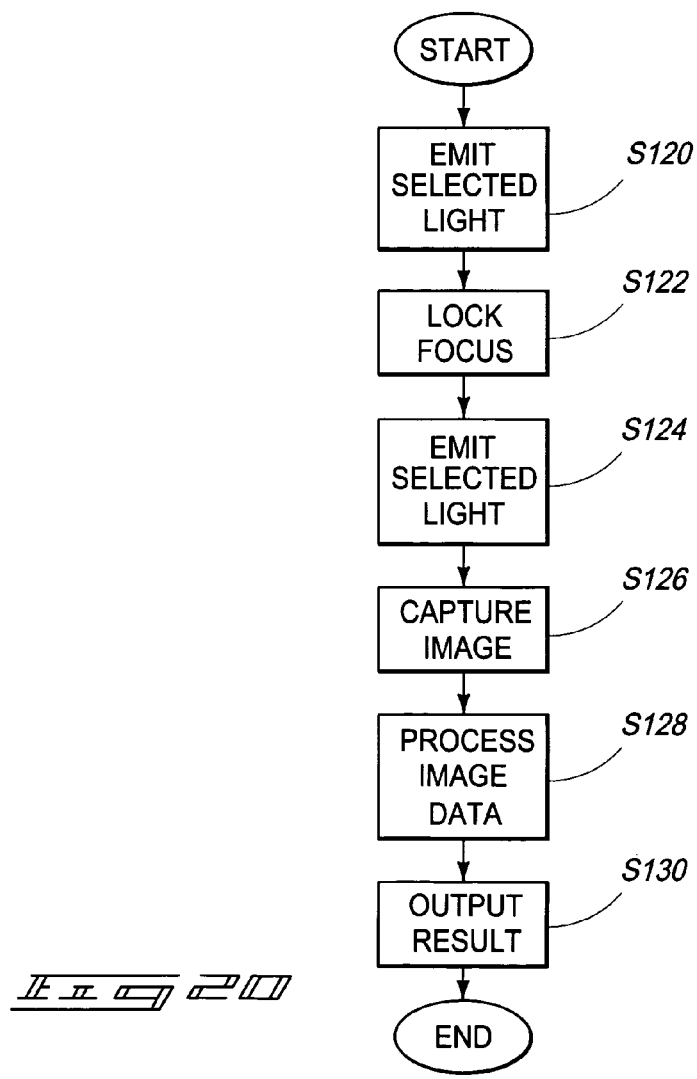
FIG. 20 is a flow chart of an exemplary method for analyzing optics of an imaging device according to one embodiment.

Referring to FIG. 20, an exemplary process is illustrated for attempting to detect chromatic aberrations of imaging device 114. Appropriate processing circuitry of analysis system 112 and/or imaging device 114 may control or implement at least some of the depicted steps in one embodiment. Other methods are possible including more, less or alternative steps.

At a step S120, appropriate light emitting devices 155 of the groupings 153a are configured to emit light. In the described exemplary embodiment, only the intermediate wavelength (e.g., green) light emitting devices 155 emit light beams at step S120.

At a step S122, the imaging device 114 receives the light beams and locks focus during the emission of the light in step S120.

At a step S124, the long and short wavelength light emitting devices 155 (e.g., red and blue) are simultaneously controlled to emit light which is passed through respective apertures 160 of mask 150. The light from the light emitting devices 155 may be mixed to provide light beams of a different wavelength than the wavelength of the light beams emitted in step S120. For example, mixing may be provided using a diffuser of emission assembly 157 and/or a diffuser (not shown) prior to passage of light through apertures 160 in possible embodiments.

At a step S126, the imaging device 114 is controlled to capture an image of the light beams emitted at step S124 at the focus determined in step S122. The captured image may be underexposed or the imaging device 114 may be otherwise controlled to capture the image at a desired exposure setting in exemplary embodiments. Controlling the exposure in some embodiments may avoid or reduce "blooming" or other enlargements due to excessive exposure to increase the accuracy of the analyses.

At a step S128, image data of the captured image is processed. Referring to FIGS. 21A and 21B, exemplary pixel locations 147 of an image sensor 146 which received image data in possible scenarios are shown. FIG. 21A illustrates an example wherein no or minimal chromatic aberrations are present within imaging device 114. FIG. 21B illustrates an example wherein chromatic aberrations are present. The pixel locations 147 of FIG. 21A which received emitted light (e.g., purple in the described example) are more focused compared with FIG. 21B. The pixel locations 147 of FIG. 21B illustrate pixels 148 which received purple light in the described example and surrounding pixels 149 which received blue light in the described example. FIG. 22A illustrates another representation of the results of FIG. 21A showing a comparatively focused group of pixel locations which received purple light 170. FIG. 22B illustrates another representation of the results of FIG. 21B showing the focused group of pixel locations which received purple light 170 as well as a relatively large number of pixel locations which received at least some blue light 172. The presence of pixels 149 shown in FIG. 21B receiving light is indicative of a chromatic aberration in imaging device 114. In one embodiment, appropriate processing circuitry may search the pixel locations of the image sensor 146 to identify the areas of the pixel locations 147 which received light. Once determined, the processing circuitry may compare the areas or number of the light sensing devices for the pixel locations 147 which received light corresponding to each of the light beams emitted from groupings 153a. If one or more of the areas is greater than a threshold, then a chromatic aberration is present in one embodiment. The threshold may be determined based upon the desired accuracy of the imaging device 114. In another embodiment, a color sensitive sharpness detection algorithm may be executed upon the image data to distinguish between the results of FIGS. 21A and 21B to determine whether a chromatic aberration is present. Other processing embodiments are possible.

At a step S130, the results of the analysis may be outputted for communication to a user. For example, computer 122 may display illustrations similar to FIG. 21A-21B or 22A-22B and/or provide a pass/fail indication.

Referring now to FIGS. 23-26, exemplary operations with respect to analysis of the ability of imaging device 114 to correctly focus images are described. The operations may analyze a focus mechanism and/or algorithm of the imaging device 114 in some implementations.

Figure 23:
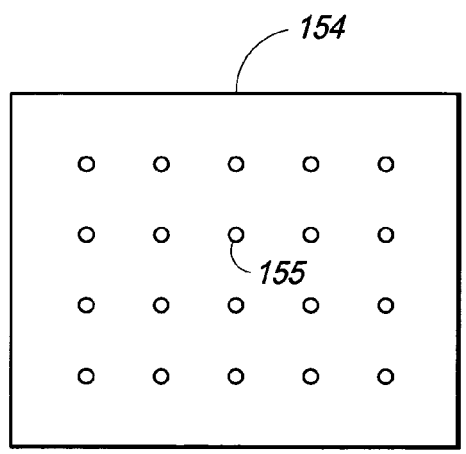
FIG. 23 is an illustrative representation of a light source according to one embodiment.

FIG. 23 illustrates an exemplary arrangement of a plurality of spatially separated light emitting devices 155 of light source 154 arranged in a grid pattern which may be illuminated to test focus operations of imaging device 114 in one embodiment. In the depicted embodiment, the light emitting devices 155 which emit light are spatially separated along two dimensions (e.g., x and y dimensions of a rectangular arrangement in the described embodiment) within a field of view of imaging device 114. Light of any suitable wavelength may be emitted in one embodiment. Mask 150a of FIG. 24 may be moved into appropriate position intermediate light source 154 and emission assembly 157 when focus operations are analyzed. Mask 150a includes a plurality of pin hole apertures 160 which correspond to the illuminated devices 155 of FIG. 23.

Figure 25A:
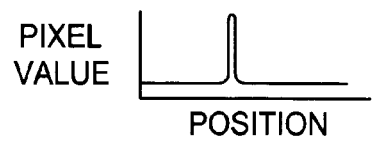
FIGS. 25A-25B are graphical representations of light received by an image sensor according to one embodiment.
Figure 25B:

Imaging device 114 is controlled to capture the light simultaneously emitted by the light emitting devices 155 through apertures 160 of mask 150a. Referring to FIGS. 25A-25B, output of pixel locations corresponding to plural light sensing devices of the image sensor which received one of the light beams from the devices 155 of FIG. 23 is shown for proper focusing operations of imaging device 114 (FIG. 25A) indicating the ability of the imaging device 114 to focus and process the received light and defective focusing operations (FIG. 25B) wherein the light of one of the light beams emitted from light source 154 is blurry when received and processed by imaging device 114. Appropriate action may be taken if the focus operations is not working properly, for example, by replacing the focus mechanism. In the described embodiment, the pixel locations of the image sensor receiving the light beams emitted by emitting devices 155 generally correspond to the spatial arrangement of the light emitting devices 155 and may be used to analyze the focusing capabilities of imaging device 114 over a plurality of spatial locations.

Figure 26:
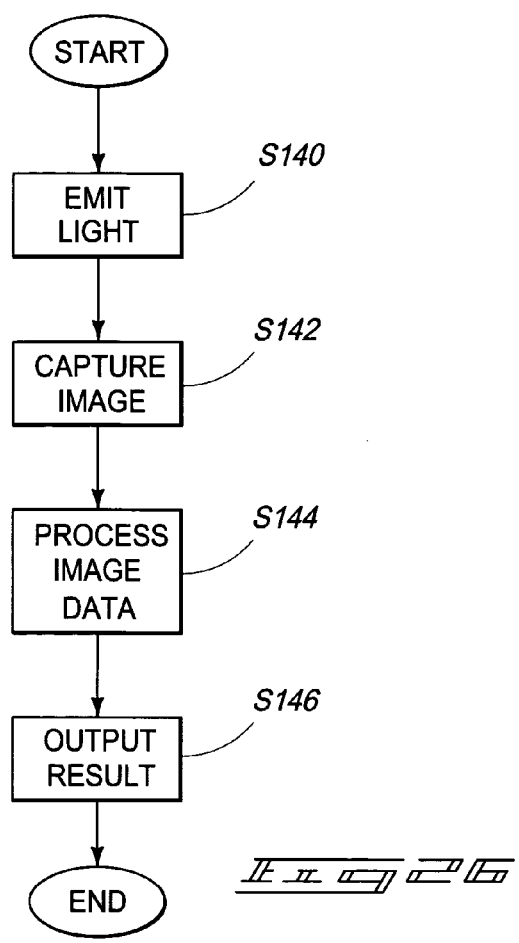
FIG. 26 is a flow chart of an exemplary method for analyzing optics of an imaging device according to one embodiment.

Referring to FIG. 26, an exemplary process is illustrated for analyzing the focus operations of the imaging device 114. Appropriate processing circuitry of analysis system 112 and/or imaging device 114 may control or implement at least some of the depicted steps in one embodiment. Other methods are possible including more, less or alternative steps.

At a step S140, the appropriate light emitting devices 155 are configured to emit light.

At a step S142, the imaging device 114 is instructed to capture an image of the received light. The captured image may be underexposed or the imaging device 114 may be otherwise controlled to capture the image at a desired exposure setting in exemplary embodiments.

At a step S144, the image data is processed to analyze the focusing operations. Similar to the method of FIG. 20, the processing circuitry may identify light sensing devices of the image sensor which received the emitted light and determine the areas (or number) of light sensing devices of the light sensor which received light from each of the respective light emitting devices 155. If the areas are individually less than a threshold, the focusing of the imaging device 114 may be deemed acceptable in one embodiment. If one or more of the areas are greater than a threshold, the focusing operations may be deemed defective in one embodiment. In another embodiment, a sharpness detection algorithm may be utilized to analyze the results from the image sensor.

At a step S146, the results of the analysis may be outputted for communication to a user. For example, computer 122 may display illustrations similar to FIGS. 25A-25B and/or provide a pass/fail indication to characterize the ability of the lens to focus and process received images.

Figures 27A, 27B:
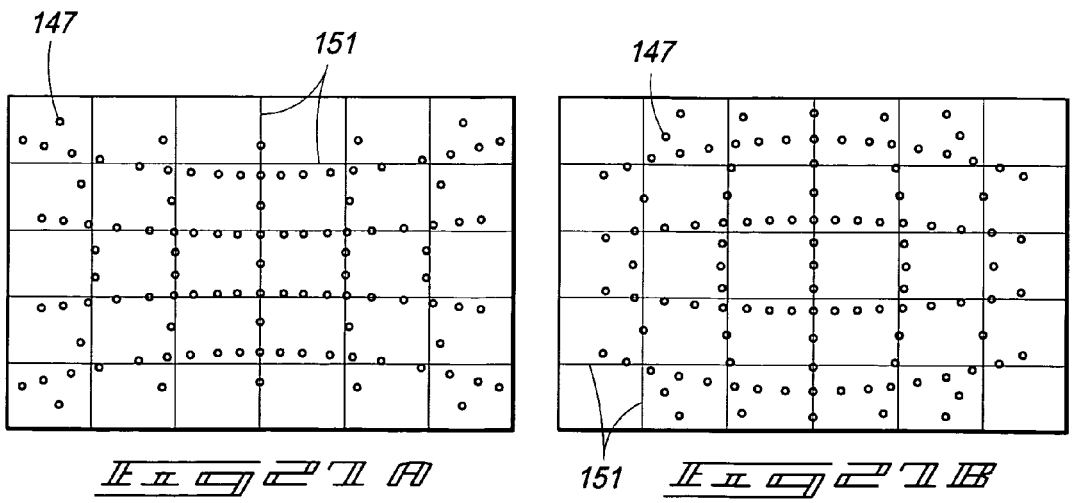
FIGS. 27A-27B are illustrative representations of light received by an image sensor and indicative of pin cushion distortion and barrel distortion, respectively, according to one embodiment.
Figure 28:
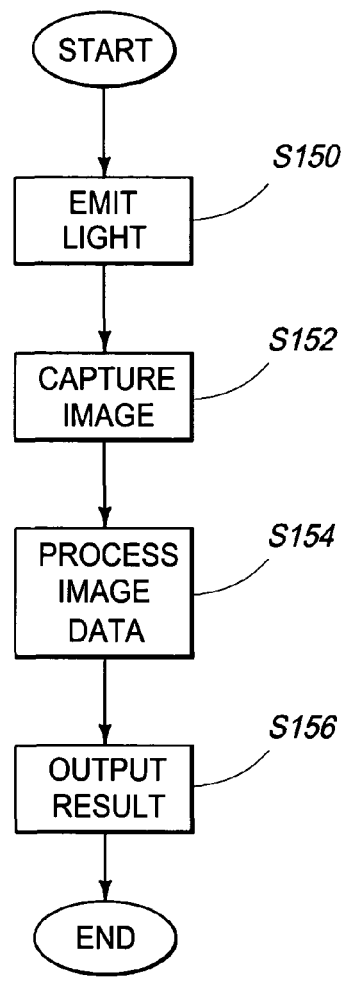
FIG. 28 is a flow chart of an exemplary method for analyzing optics of an imaging device according to one embodiment.

Referring to FIGS. 27A-28, exemplary aspects are described with respect to analyzing optics of the imaging device 114 including identifying the presence of pin cushion or barrel distortion according to exemplary embodiments. In one embodiment, the operations with respect to this analysis may be performed after the above-described operations with respect to the focus test have been performed for the respective imaging device 114 and focus test results were acceptable.

Figure 24:
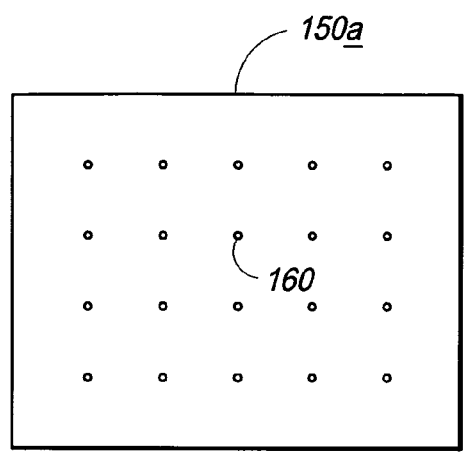
FIG. 24 is an illustrative representation of a mask according to one embodiment.

The pattern of light emitting devices 155 which emitted light in FIG. 23 and the mask 150a of FIG. 24 may be utilized in one embodiment. For example, the light emitting devices 155 may be arranged in a pattern including a plurality of straight lines comprising rows and columns of a grid. Other patterns of devices 155 are possible. Exemplary results determined by image data captured by the image sensor responsive to the received light are shown in FIG. 27A which is indicative of pin cushion distortion in the optics and FIG. 27B which is indicative of barrel distortion in the optics (i.e., the number of depicted pixel locations 147 which received light is greater than the number of light emitting devices 155 of FIG. 23 which emitted light to facilitate the graphical representation of the pin cushion and barrel distortion). If no distortion is present, the light sensing devices of the image sensor which received the light should resemble a grid similar to the array of light emitting devices 155 which emitted the light through the respective apertures 160 as represented by exemplary straight lines 151 corresponding to rows and columns. Once pixel locations 147 of light sensing devices of the image sensor which received the light are identified (e.g., using a search algorithm), the processing circuitry attempts to determine whether the pixel locations 147 occur within a pattern aligned with or otherwise corresponding to the pattern of the light emitting devices 155 which emitted the light beams. For example, the processing circuitry may determine if the light was received by light sensing devices arranged in straight lines 151 of rows and columns of the respective pattern within acceptable tolerance levels. The processing circuitry may identify some of the pixel locations 147 corresponding to rows and columns. A defective imaging device 114 may be identified if one or more of the remaining pixel locations 147 deviates from the determined rows or columns by a distance in excess of a threshold. In another embodiment, the pixel locations 147 may be displayed for observation by a user and a user may determine whether the imaging device 114 passed or failed the test analysis. Other processes may be used to identify the distortion and/or determine whether the results are acceptable or not.

Referring to FIG. 28, an exemplary process is illustrated for analyzing for the presence of pin cushion or barrel distortion of the imaging device 114. Appropriate processing circuitry of analysis system 112 and/or imaging device 114 may control or implement at least some of the depicted steps in one embodiment. Other methods are possible including more, less or alternative steps.

At a step S150, the appropriate light emitting devices 154 arranged in a grid (e.g., FIG. 23) in one embodiment are configured to emit light.

At a step S152, the imaging device 114 captures an image of the received light. The captured image may be underexposed or the imaging device 114 may be otherwise controlled to capture the image at a desired exposure setting in exemplary embodiments.

At a step S154, the image data is processed to determine the presence of absence of distortion. The processing circuitry may identify pixel locations of light sensing devices of the image sensor which received the emitted light and attempt to map the pixel locations to rows and columns of a grid. A pass status may be indicated if the mapping is provided within an acceptable tolerance, otherwise the imaging device 114 may be indicated to be defective.

At a step S156, results of the analysis may be outputted for communication to a user. For example, computer 122 may display illustrations similar to FIGS. 27A-27B and/or provide a pass/fail indication.

Figure 29:
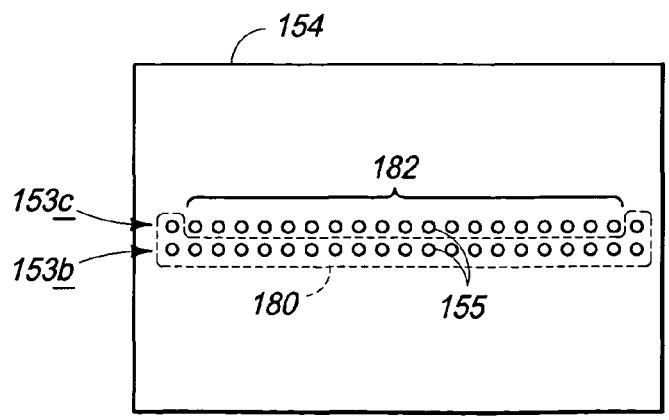
FIG. 29 is an illustrative representation of a light source according to one embodiment.

Referring to FIGS. 29-31, exemplary aspects are described with respect to analyzing exposure operations (e.g., shutter and/or image sensor exposure speed) of the imaging device 114 according to one embodiment.

Referring to FIG. 29, exemplary light emitting devices 155 of light source 154 which emit light are shown according to the described embodiment. According to one embodiment, a plurality of light beams are illuminated at known times for known durations to test shutter (if present) and image capture or exposure time of an image sensor of imaging device 114. First and second groupings 153b, 153c are shown comprising plural light emitting devices 155 spatially separated from one another in the example FIG. 29. The light emitting devices 155 of first grouping 153b are provided as a control or reference to assist with the analysis operations and may be constantly illuminated during analysis procedures. A second grouping 153c of light emitting devices 155 is arranged to implement operations to test shutter speed operations of imaging device 114. In the depicted embodiment, the leftmost and rightmost light emitting devices 155 of second grouping 153c may be control or reference devices and constantly illuminated during the analysis procedures. The control light emitting devices 155 are shown as reference 180 in the example of FIG. 29. The light emitting devices 155 intermediate the control devices 180 of the second grouping 153c may be referred to as analysis devices 182 in the described embodiment.

To analyze the exposure speed operations, the imaging device 114 is instructed to capture an image at a desired exposure speed as the analysis devices 182 are sequentially illuminated. In the described embodiment, individual ones of the analysis devices 182 are illuminated for a common duration less than the exposure time of imaging device 114 (e.g., when a shutter of the imaging device 114 is open and/or the length of time of exposure of the image sensor) corresponding to a selected exposure speed (e.g., an exemplary illumination duration of $1/1000$ second for analysis devices 182 may be used for an exposure speed of $1/125$ second). The number of analysis devices 182 from which light was captured by the imaging device 114 during the exposure is indicative of the exposure speed in one embodiment.

More specifically, referring to FIG. 30, test results of an exposure speed setting of $1/125$ for a properly functioning imaging device 114 is shown. As shown in FIG. 30, a plurality of pixel locations 147 of the image sensor which received light are shown. Light from the control devices 180 is shown at pixel locations 184 while light from eight of the analysis devices 182 is shown at pixel locations 186. Light from eight of the analysis devices 182 indicates that the exposure operation was acceptable in the described exemplary embodiment (i.e., eight times $1/1000=1/125$). Light at more or less pixel locations 186 indicates that the exposure speed is slow or fast, respectively. The duration of illumination of individual ones of the analysis devices 182 may be varied in other embodiments to test other exposure speeds.

Referring to FIG. 31, an exemplary process for analyzing the shutter speed of imaging device 114 is illustrated. Appropriate processing circuitry of analysis system 112 and/or imaging device 114 may control or implement at least some of the depicted steps in one embodiment. Other methods are possible including more, less or alternative steps.

At a step S160, the appropriate light emitting devices 154 are controlled to emit light. The emission includes constantly illuminating the control devices 180 and sequentially illuminating the analysis devices 182 for a desired duration in one embodiment.

At a step S162, the imaging device 114 captures an image of the received light according to a desired shutter speed setting. The captured image may be underexposed or the imaging device 114 may be otherwise controlled to capture the image at a desired exposure setting in exemplary embodiments.

At a step S164, the image data from a light sensor of the imaging device 114 is processed to implement analysis operations with respect to the speed of the shutter. The processing circuitry may add the number of pixel locations 186 which received light and multiply the result by the duration of illumination of individual ones of the analysis devices 182 to provide information regarding the shutter speed operations.

At a step S166, results of the analysis may be outputted for communication to a user. For example, computer 122 may display an illustration similar to FIG. 30, provide the calculated shutter speed and/or provide a pass/fail indication.

Referring to FIG. 32, exemplary aspects are described for calculating gain maps of a respective imaging device 114 according to one embodiment. The gain maps may provide a calibration/compensation for uneven luminance response across the image sensor of the respective imaging device 114. The gain maps may be calculated and stored in the respective imaging device 114 and applied to subsequently generated image data to reduce effects of image sensor variances of different imaging devices 114 and/or lens fall off of the respective imaging device 114 if device 114 includes a lens. Appropriate processing circuitry of analysis system 112 and/or imaging device 114 may control or implement at least some of the depicted steps in one embodiment. Other methods are possible including more, less or alternative steps.

At a step S170, the light source 154 is controlled to emit light for analysis operations. In one embodiment, a sufficient number of light emitting devices 155 of the light source are controlled to provide substantially uniform illumination by light source 154. The emitted light is substantially neutral (white) in one embodiment. The light may be mixed using a diffuser such as emission assembly 157.

At a step S172, the imaging device 114 is controlled to capture an image of the emitted light. A plurality of color channels (e.g., red, green and blue) may be measured separately from the image sensor responsive to the emitted light.

At a step S174, image data from the image sensor of the imaging device 114 is accessed. A plurality of sections may be defined for the image sensor and the image data. Individual sections may be as small as a single pixel location or larger. For example, if the image sensor is embodied as a rectangle, a plurality of sections may be defined according to a grid including seven sections in the x direction and five sections in the y direction in but one embodiment. The sections may be uniformly sized to comprise the same number of pixel locations in one embodiment.

For individual ones of the sections, average pixel values are calculated for respective ones of the color channels and the determined average pixel values for the section are summed in one embodiment. The section having the largest summed value is identified (e.g., typically the section located at the center of the image sensor). Following the identification, a plurality of correction factors may be identified for the other sections usable to bring the average values of the sections to equal the determined highest value. For example, for a given section n, the respective correction factor for a given channel (e.g., red) may be calculated as follows:

$$\text{Red Correction Factor}_n = \text{Red Highest Average}/\text{Red Section}_n \text{ Average}$$

Correction factors may be similarly determined for the other color channels of the respective section. Thereafter, additional correction factors for the channels may be calculated for the remaining sections. The correction factors determined in accordance with the above exemplary equation are ratios indicative of a relationship of intensities of image data of pixels of the respective sections.

At a step S176, the calculated correction factors are stored as a gain map for the respective imaging device 114 and subsequently applied to image data acquired by the image sensor of the imaging device. For example, the appropriate correction factors may be multiplied by data acquired by respective sections of the light sensor of the imaging device 114. In one embodiment, the gain maps are stored using storage circuitry of the respective imaging device 114.

The above-described exemplary method provides a one-point correction (e.g., a uniform white correction factor in the described embodiment). In other embodiments, other corrections may be provided (e.g., a three-point correction for increased accuracy). In one three-point implementation, the light is emitted from light source 154 at different intensities of the light emitting devices 155 (e.g., full intensity, 50% intensity for 50% uniform gray, and 20% intensity for 20% uniform gray). Thereafter, a plurality of correction factors may be determined for an individual channel of an individual section for the different intensities. The correction factors for full intensity may be determined using the formula described above with respect to step S174 in one embodiment. The correction factors for the 50% and 20% intensities may be calculated using plural different emissions of light at 50% and 20% intensities and the same formula but substituting fixed values for the numerator of the formula (e.g., for eight bit output at respective pixel locations a value of 128 may be used for the 50% uniform gray and a value of 51 may be used for 20% uniform gray).

Thereafter, one of the three correction factors of a respective channel of a respective section may be selected according to the value of the respective image data for the channel. For example, if an eight bit value provided by a pixel location is between an intensity range of 0-80, the 20% intensity correction factor may be used. If the value is in the intensity range of 81-191, the 50% intensity correction factor may be used. If the value is in the intensity range of 192-256, the uniform white correction factor may be used. After the respective correction factor is identified, the image data for the pixel location may be modified using the respective correction factor. In other embodiments, more or less correction factors may be calculated and used.

Exemplary aspects of at least one embodiment enable numerous different analysis operations of an imaging device to be performed by the analysis system (e.g., measure, calibrate, tune and/or upgrade imaging devices). Advantages of some embodiments include reduced cost for providing the analysis operations in less time facilitating usage in high volume applications such as in a fabrication environment. In one embodiment, the analysis operations are automated using minimal or no input from a user. Accordingly, novice users may interact with disclosed systems and devices to implement analysis of their imaging device. Using the apparatus and methods described herein, analyzed imaging devices may be tuned to deliver improved image quality and/or other features. The exemplary described analysis aspects may be performed at a time of manufacture of the imaging device as well as after sale of the imaging device inasmuch as an image sensor of the imaging device may change characteristics over time resulting in degraded image quality.

The protection sought is not to be limited to the disclosed embodiments, which are given by way of example only, but instead is to be limited only by the scope of the appended claims.

What is claimed is:

1. An imaging device analysis system comprising:
a light source that outputs light for use in analyzing at least one imaging component comprising a lens of an imaging device that generates images responsive to received light, wherein the light source outputs first light having a first wavelength characteristic at a first moment in time and outputs second light having a second wavelength characteristic different from the first wavelength characteristic at a second moment in time, and the light source outputs the second light as a plurality of light beams directed along different respective spatially separated beam paths; and
processing circuitry that is coupled with the light source and controls the light source to optically communicate the light to the imaging device and to lock a focus of the lens of the imaging device using the light of the first wavelength characteristic at the first moment in time, wherein the processing circuitry accesses image data generated by the imaging device in response to receipt of the light from the light source having the second wavelength characteristic at the second moment in time with the focus of the lens locked, the processing circuitry identifies in the image data areas corresponding to locations of an image sensor of the imaging device that received light of second wavelength characteristic, and the processing circuitry determines whether a chromatic aberration is present within the lens based on an analysis of the identified areas.

2. The system of claim 1 wherein the light source is configured to output the light comprising infrared light for use in testing at least one imaging component comprising the lens and an infrared cutoff filter configured to filter infrared light.

3. The system of claim 1 further comprising a mask that comprises a plurality of spatially separated apertures in a configuration matching a spatial arrangement of the plurality of light beams output by the light source, the mask being selectively moveable to a position intermediate the light source and the imaging device.

4. The system of claim 3 wherein the processing circuitry is configured to control movement of the mask with respect to the position.

5. The system of claim 1, wherein the processing circuitry is configured to process the image data generated at a plurality of pixel locations of the image sensor of the imaging device corresponding to the identified areas in the image data to determine the operational status comprising distortion of the at least one imaging component comprising the lens of the imaging device.

6. The system of claim 1 wherein individual ones of the light beams are outputted for a duration less than an exposure time of the imaging device, and the processing circuitry is configured to process the image data to determine the operational status comprising shutter speed of the at least one imaging component comprising a shutter of the imaging device.

7. The system of claim 1 wherein the processing circuitry is configured to determine the operational status of the at least one component comprising an image sensor, and to determine at least one correction factor for use in modification of image data generated using the image sensor.

8. The system of claim 1 wherein the processing circuitry is configured to process the image data comprising comparing a number of pixels of the image sensor which received the light having the second wavelength with respect to a threshold to determine whether the chromatic aberration is present.

9. An imaging device analysis method comprising:
fixing focus of a lens of an imaging device configured to generate images responsive to received light;
outputting a plurality of light beams directed along different respective spatially separated beam paths, wherein each light beam comprises light in each of multiple discrete wavelength ranges;
receiving the light beams using the imaging device after the fixing;
generating image data using the imaging device responsive to the receiving the light beam;
identifying in the image data areas corresponding to locations of an image sensor of the imaging device that received the light beams; and
determining whether a chromatic aberration of the lens of the imaging device is present based on an analysis of the identified areas, wherein for each of the identified areas of the imaging device the analysis comprises ascertaining different regions of the identified area that received light having different respective mixes of the discrete wavelength ranges of light.

10. The method of claim 9 wherein:
the fixing comprises outputting first light having a first wavelength characteristic and locking a focus of the lens of the imaging device using the light of the first wavelength characteristic; and
the outputting comprises outputting the plurality of light beams with a second wavelength characteristic different from the first wavelength characteristic.

11. The method of claim 9 further comprising:
providing a mask comprising a plurality of apertures;
passing the light beams through respective ones of the apertures; and
wherein the receiving comprises receiving after the passing.

12. The method of claim 9 wherein the receiving the light beams comprises receiving using an image sensor of the imaging device, and wherein the determining comprises:
identifying a number of pixel locations of the image sensor which received the light beams; and
comparing the number of pixel locations with respect to a threshold.

13. The method of claim 12 wherein the analyzing identifies that the chromatic aberration of the lens is present if the comparing determines that the number of pixel locations which received the light beam exceeds the threshold.

14. The method of claim 9 wherein the outputting the light beams comprises outputting light of a plurality of wavelengths and mixing the light of the plurality of wavelengths.

15. The method of claim 9 wherein the generating comprises generating using the imaging device with the focus of the lens of the imaging device the same as during the fixing.

16. The method of claim 9 wherein the fixing comprises fixing prior to the receiving, and the receiving and the generating comprise receiving and generating using the imaging device with the focus of the lens of the imaging device the same as during the fixing.

17. An imaging device analysis method comprising:
outputting a light beam for communication to an imaging device configured to generate images responsive to received light;
focusing the light beam using a lens of the imaging device;
after the focusing, receiving the light beam using an image sensor of the imaging device;
generating image data using the image sensor of the imaging device responsive to the receiving the light beam;
processing the image data corresponding to a plurality of pixel locations of the image sensor, wherein the processing comprises determining respective sizes of one or more areas of the image sensor illuminated by the light beam and ascertaining whether a chromatic aberration is present based on the one or more determined sizes; and
indicating results of the focusing by the lens using the processing.

18. The method of claim 17 wherein the outputting comprises outputting a plurality of light beams spatially separated from one another, and wherein the processing comprises processing the image data at the pixel locations spatially separated from one another and corresponding to spatial locations of the light beams.

19. The method of claim 17 wherein the light beams are spatially separated from others of the light beams along two dimensions within a field of view of the lens of the imaging device.

20. The method of claim 17 wherein the outputting comprises outputting a plurality of light beams and passing the light beams through a mask.

21. The method of claim 17 wherein the determining comprises identifying a number of pixel locations which received light of the light beam and the ascertaining comprises comparing the number of pixel locations with respect to a threshold.

22. The method of claim 21 wherein the indicating comprises indicating that the ability of the lens to focus is unacceptable if the number of pixel locations which received the light beam exceeds the threshold.

23. The method of claim 17 wherein the indicating comprises indicating the results of the focusing by the lens comprising information regarding an ability of the lens to focus the light beam.

24. The method of claim 17 wherein the indicating comprises indicating the results of the focusing by the lens comprising information regarding accuracy of the focusing of the light beam using the lens of the imaging device.

25. An imaging device analysis method comprising:
outputting a plurality of light beams for communication to an imaging device configured to generate images responsive to received light, wherein the outputting comprises outputting the plurality of light beams in a pattern that provides the light beams arranged in a plurality of straight lines;
accessing image data generated by the imaging device responsive to the light beams communicated to the imaging device;
processing the image data to identify in the image data areas corresponding to locations of an image sensor of the imaging device that received the light beams, wherein the processing comprises identifying a plurality of pixel locations of the imaging device which received the light beams, comparing the pixel locations to the pattern, and analyzing alignment of the pixel locations with respect to the straight lines; and
determining distortion of optics of the imaging device based on the analyzing of the identified areas.

26. The method of claim 25 wherein the pattern comprises the light beams arranged in a plurality of straight lines comprising rows and columns of a grid.

27. The method of claim 25 wherein the providing information comprises providing information regarding pin cushion distortion.

28. The method of claim 25 wherein the providing information comprises providing information regarding barrel distortion.

29. The method of claim 25 wherein the providing the information regarding distortion comprises indicating whether the lens has an acceptable amount of distortion or unacceptable amount of distortion.

30. The method of claim 25 wherein the providing the information regarding distortion comprises providing using the processing of the image data which is indicative of intensity of the light beams received by a plurality of pixels of the imaging device.

31. The method of claim 25 wherein the providing information comprises providing the information to indicate that the optics of the imaging device have unacceptable distortion as a result of the comparing.

32. The method of claim 31 wherein the providing information to indicate that the optics of the imaging device have unacceptable distortion comprises providing as a result of the comparing determining that a deviation of at least one of the pixel locations from the pattern exceeds a threshold.

33. The method of claim 25, wherein the plurality of light beams are outputted in a pattern that provides the light beams in a rectangular grid pattern of spaced-apart beam locations.

* * * * *